United States Patent [19]

Ramanthan

[11] 4,066,637

[45] Jan. 3, 1978

[54] BASIC DIAMINOPYRIDINE-(3)-AZO DYESTUFFS

[75] Inventor: Visvanathan Ramanthan, Basel, Switzerland

[73] Assignee: Ciba-Geigy Corporation, Ardsley, N.Y.

[21] Appl. No.: 605,786

[22] Filed: Aug. 18, 1975

Related U.S. Application Data

[63] Continuation of Ser. No. 480,457, June 18, 1974, abandoned, which is a continuation-in-part of Ser. No. 316,803, Dec. 20, 1972, abandoned.

[51] Int. Cl.[2] ...................... C09B 29/36; C09B 45/00; D06P 3/52; D06P 3/76

[52] U.S. Cl. ............................ 260/146 R; 260/146D; 260/152; 260/154; 260/155; 260/156; 260/205; 260/206; 260/207; 260/207.1; 260/270 R; 260/294.8 G; 260/294.9

[58] Field of Search ............... 260/156, 153, 154, 155, 260/146 R, 146 D

[56] References Cited

U.S. PATENT DOCUMENTS

| | | | |
|---|---|---|---|
| 1,680,109 | 8/1928 | Ostromislensuy | 260/156 |
| 1,856,601 | 5/1932 | Telza et al. | 260/156 |
| 1,862,361 | 6/1932 | Dohrn et al. | 260/156 |
| 2,068,353 | 1/1937 | Schneiderwirth | 260/156 |
| 2,156,141 | 4/1939 | Binz et al. | 260/156 |
| 2,307,650 | 1/1943 | Tisza et al. | 260/156 X |
| 2,431,190 | 11/1947 | Morgan | 260/156 X |
| 3,640,674 | 2/1972 | Berrie et al. | 260/156 X |
| 3,657,214 | 4/1972 | Berrie et al. | 260/156 |
| 3,725,383 | 4/1973 | Austin et al. | 260/146 T |
| 3,899,478 | 8/1975 | Fleckenstein et al. | 260/156 |
| 3,950,321 | 4/1976 | Dehnert et al. | 260/156 |

*Primary Examiner*—Floyd D. Higel
*Attorney, Agent, or Firm*—Edward McC. Roberts; Michael W. Glynn; Prabodh I. Almaula

[57] ABSTRACT

A basic azo dyestuff, which is free form acid groups conferring solubility in water, of the formula

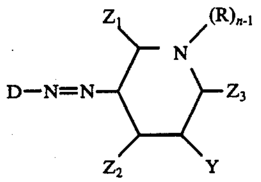

wherein two radicals Z represent groups of the formula —NR'R'' and one radical Z represents a group of the formula —NR'R'', —OR''' or —SR''', wherein R', R'', and R''' each represents hydrogen, aryl, cycloalkyl or an aliphatic radical and R' and R'' are able to form a ring containing the amino nitrogen and the radicals —NR'R'' may be the same or different, R is alkyl, substituted alkyl or cycloalkyl, *n* is 1 or 2, Y represents a radical of the formula —CN or —$CONH_2$, and D represents the radical of an aromatic or heterocyclic diazo component, and wherein at least one radical Z and/or D contains a basic, optionally cationic group. These dyestuffs are useful for dyeing and printing synthetic fibers to produce intensive and level dyeings with good fastness to light and general fastness properties.

25 Claims, No Drawings

BASIC DIAMINOPYRIDINE-(3)-AZO DYESTUFFS

This is a continuation of application Ser. No. 480,457, filed June 18, 1974, now abandoned, which in turn is a continuation-in-part of application Ser. No. 316,803, filed Dec. 20, 1972 and now abandoned.

The present invention provides new basic azo dyestuffs, which are free from acid groups conferring solubility in water, of the formula

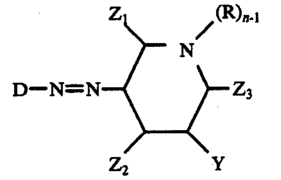

wherein two radicals Z represent groups of the formula —NR'R" and one radical Z represents a group of the formula —NR'R", —OR'" or —SR'", wherein R', R", and R'" each represents hydrogen, aryl, cycloalkyl or an aliphatic radical and R' and R" are able to form a ring containing the amino nitrogen and the radicals —NR'R" may be the same or different, R is alkyl, substituted alkyl or cycloalkyl, $n$ is 1 or 2, Y represents a radical of the formula —CN or —$CONH_2$, and D represents the radical of an aromatic or heterocyclic diazo component, and wherein at least one radical Z and/or D contains a basic, optionally cationic group.

If $n$ is one, the new dyestuffs correspond to the formula

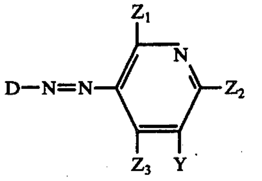

(2)

wherein two radicals Z represent groups of the formula —NR'R" and one Z represents a group of the formula —NR'R", —OR'" or —S—R'", in which R', R" and R'" each represents hydrogen, aryl, cycloalkyl or an aliphatic radical and R' and R" are able to from a ring containing the amino nitrogen and the radicals—NR'R" may be the same or different, Y represents a radical of the formula —CN or —$CONH_2$, and D represents the radical of an aromatic or heterocyclic diazo component and wherein at least one radical Z and/or O contains a basic, optionally cationic group.

Dyes which constitute a preferred embodiment of the invention are of the formula

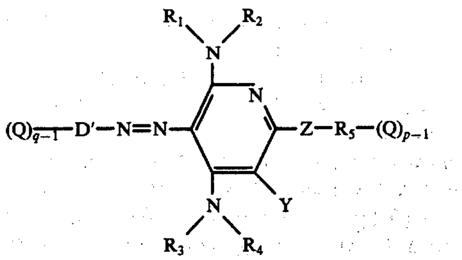

wherein D' is the radical of an aromatic or heterocyclic diazo component and Y is a group of the formula —CN or—$CONH_2$ and $R_1$, $R_2$, $R_3$ and $R_5$ each represents hydrogen or an aryl, cycloalkyl or aliphatic radical, it being possible for $R_1$ with $R_2$ and $R_3$ with $R_4$ to form a ring containing the amino nitrogen and Q represents an optionally quaternised amino, hydrazino or etherified hydroxylamino or pyridine group, which is bonded directly or through a bridge, and $p$ and $q$ is each 1 or 2, and if both $p$ and $q$ are 1, D' is a heterocycle with a quaternised ring nitrogen atom, and wherein Z is an oxygen or sulphur atom or an imino group of the formula

wherein $R_6$ is hydrogen, aryl, cycloalkyl or an aliphatic radical which may be linked with $R_5$ or Q. The basic radical Q may be bonded directly to the aromatic or heterocyclic nucleus; but it can also be located at a substituent, e.g. an alkyl or alkoxy group of the diazo component, or linked with the dye molecule through an alkylenecarbonyl, carbonyloxy, carbonylamino, alkylenecarbonyloxy, alkylenecarbonylamino, alkylenesulphonylamino or alkylenesulphonyl bridge. The basic group Q can also form a ring together with $R_5$ and Z, for example a piperazine radical.

By aryl, cycloalkyl and aliphatic radicals are meant preferably radicals of the benzene series, cyclohexyl or optionally substituted alkyl radicals with at most 12 carbon atoms, it being possible for these last named radicals to be interrupted by oxygen or sulphur atoms or by imino groups. The radicals R at the same nitrogen atom can be linked with each another directly or through heteroatoms, in particular oxygen and sulphur, i.e. R' with R", $R_1$ with $R_2$, $R_3$ with $R_4$ and, in particular, $R_5$ with $R_6$. The radical Z can thus also be, for example, a piperidine, pyrrolidine or morpholine radical.

Suitable examples of aliphatic radicals R', R'", $R_1$, $R_2$, $R_3$, $R_4$, $R_5$ and $R_6$ are: methyl, ethyl, propyl, isopropyl, butyl, sec. butyl, n-pentyl and octyl radicals, which can be interrupted by oxygen atoms and substituted by hydroxy, carboxyl, carbalkoxy (with 2 to 6 carbon atoms), alkoxy (with 1 to 8 carbon atoms), phenoxy, acyloxy (with 1 to 10 carbon atoms), or by phenyl groups which are optionally substituted with halogen atoms, lower alkyl or lower alkoxy, β-hydroxyethyl or lower carboalkyloxy groups. Thus the term "aliphatic radicals" also encompasses such groups as benzyl or phenethyl.

Examples of suitable acyl radicals are fatty acid radicals with up to 5 carbon atoms, such as formyl, acetyl, propionyl, butyl radicals; alkylcarbamyl radicals with up to 5 carbon atoms, such as methylaminocarbonyl, ethylaminocarbonyl, propylaminocarbonyl or butylaminocarbonyl radicals; alkyloxycarbonyl radicals with up to 5 carbon atoms, such as methoxycarbonyl, ethoxycarbonyl, propoxycarbonyl or butoxycarbonyl radicals; phenylcarbamyl or phenoxycarbonyl radicals, benzoyl, phenoxyacetyl, chloroethyl or phenylacetyl radicals.

Preferred dyes of the formula (3) are those in which D is a radical of the benzene series or a sulphur-and/or nitrogen-containing heterocyclic radical, as well as dyes in which $R_1$, $R_2$, $R_3$ and $R_4$ represent hydrogen.

If $n$ is 2, the new dyestuffs correspond to the general formula

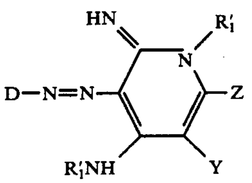

(4)

In this formula $R_1'$ denotes alkyl, substituted alkyl or cycloalkyl, Z denotes a radical of the formula

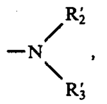

—$OR'_4$ or —$SR'_5$, wherein $R'_2$, $R'_3$, $R'_4$ or $R'_5$ independently of one another denote hydrogen, aryl or the same as $R'_1$, or $R'_2$ and $R'_3$, conjointly with the nitrogen atom linking them, optionally with the inclusion of a further hetero-atom, can form a non-aromatic 5- or 6-membered heteroring, Y denotes the —$CONH_2$ group or preferably the —CN group, and D denotes the radical of an aromatic or heterocyclic diazo component, and the radical Z and/or D contains a basic group.

$R'_1$ is preferably an alkyl radical with 1 to 6 C atoms, a cyclohexyl radical or a benzyl or phenethyl radical.

The dyestuffs according to the invention, which represent chemically unitary individual species, are subject to the laws of tautomerism. The tautomerism can be represented by means of the following formulae:

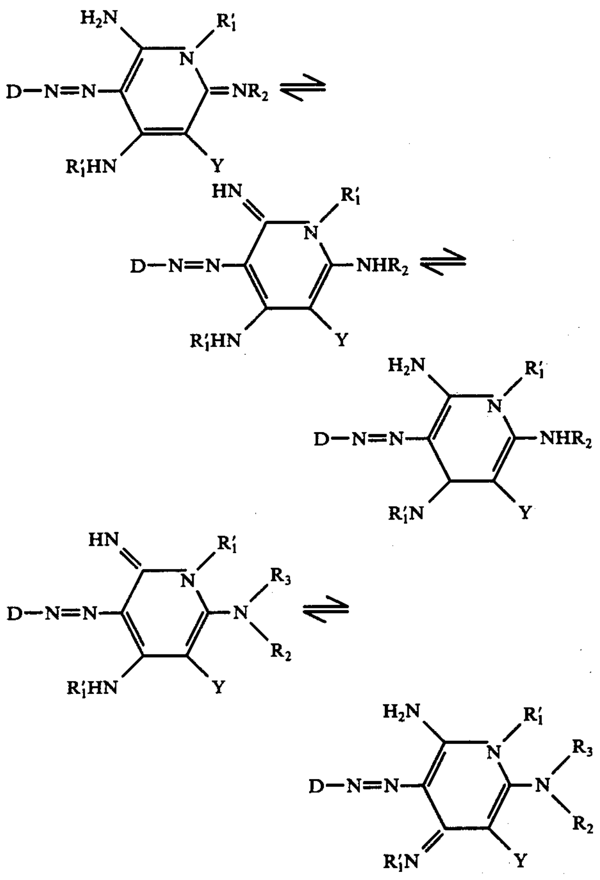

-continued

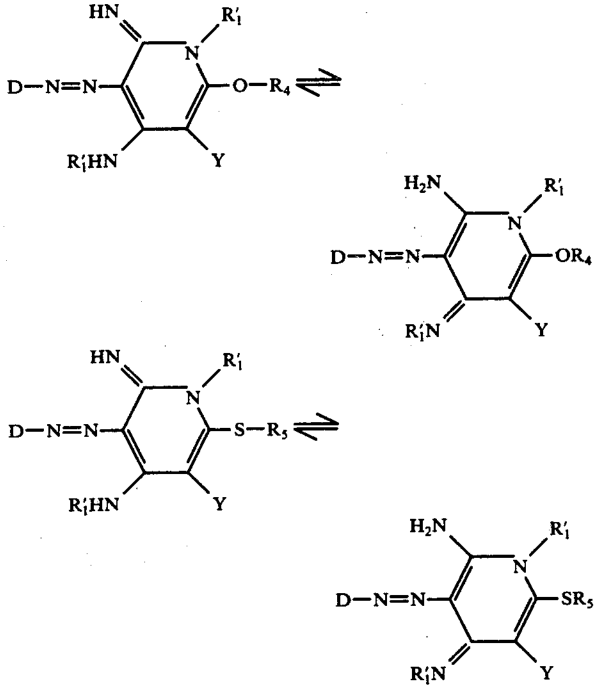

wherein $R_1'$, $R_2'$, $R_3'$, $R_4'$, $R_5'$, Y and D have the meaning indicated above. The dyestuffs which are represented tautomerically are preferred embodiments of the invention.

If $R_1'$, $R_2'$, $R_3'$, $R_4'$ and $R_5'$ denote optionally substituted alkyl radicals, these are advantageously straight-chain or branched-chain lower alkyl groups which can contain substituents, especially the hydroxyl, carboxyl, nitrile, carbalkoxy (with 2 to 6 carbon atoms), alkoxy (with 1 to 8 carbon atoms), phenoxy, acyloxy (with 1 to 5 carbon atoms) or aryl group, such as a phenyl group which is optionally substituted by halogen atoms, or by the lower alkyl, lower alkoxy, β-hydroxyethyl or lower carbalkoxy group, and/or can be interrupted by oxygen or sulphur atoms or by the groups of the formula —NH—, 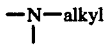 or 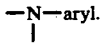

In this case, $R_1'$, $R_2'$, $R_3'$, $R_4'$ and $R_5'$ denote, for example, the methyl, ethyl, propyl, isopropyl, butyl, sec.-butyl, n-pentyl, octyl, β-hydroxyethyl, β- or γ-hydroxypropyl, α-methyl-β-hydroxyethyl, methoxymethyl, ethoxymethyl, β-methoxyethyl, β-ethoxyethyl, β-cyanoethyl, benzyl, methylbenzyl, chlorobenzyl, phenethyl, β-chloroethyl or β-bromoethyl group. As acyl radicals, the acyloxy groups preferably contain fatty acid radicals having up to 5 carbon atoms. The following may be mentioned: formyl, acetyl, propionyl and butyryl radicals; alkylcarbamyl radicals having up to 5 carbon atoms, such as methylaminocarbonyl, ethylaminocarbonyl, propylaminocarbonyl or butylaminocarbonyl radicals; alkyloxycarbonyl radicals having up to 5 carbon atoms, such as methoxycarbonyl, ethoxycarbonyl, propoxycarbonyl or butoxycarbonyl radicals; or phenylcarbamyl or phenoxycarbonyl radicals, benzoyl, phenoxyacetyl, chloroacetyl or phenylacetyl radicals.

If $R_1'$, $R_2'$, $R_3'$, $R_4'$ and $R_5'$ denote a cycloalkyl radical, examples of suitable cycloalkyl groups are those with, preferably, 5- or 6-membered rings and particularly the cyclohexyl group.

If $R_2'$, $R_3'$, $R_4'$ and $R_5'$ denote an aryl radical, this preferably belongs to the benzene series; it can contain one or more customary non-ionic ring substituents. The following examples of such substituents, especially on the phenyl radical, may be mentioned: halogen atoms, such as chlorine, bromine or fluorine, alkyl groups with 1 to 6 carbon atoms, which in turn can be substituted by bromine or chlorine atoms or by lower alkoxy, nitrile or lower alkyloxycarbonyl groups, - such as, for example, those mentioned above - and also lower alkyloxycarbonyl, trifluoromethyl, alkanoyl, aminocarbonyloxy, aminosulphonyl, lower alkylaminosulphonyl, di(lower alkylamino)sulphonyl, alkylsulphonyl, alkylthio or arylthio groups. The following examples of the last-named substituents may be mentioned: the methoxycarbonyl, ethoxycarbonyl or propoxycarbonyl group, the acetyl group, the methoxycarbonylamino or ethoxycarbonylamino group, the methylsulphonyl or ethylsulphonyl group, or the methylthio, ethylthio or phenylthio group.

If $R_2'$ and $R_3'$, conjointly with the nitrogen atom linking them, optionally with the inclusion of a further hetero-atom, form the radical of a non-aromatic 5- or 6-membered heteroring, this can be especially the piperidino, pyrrolidino, morpholino, piperazine, methylpiperazino or acetylpiperazino group.

$R_1'$ is preferably a cycloalkyl radical with 5 to 9 C atoms, particularly a cyclohexyl radical or an optionally substituted alkyl radical, particularly an alkyl radical with 1 to 6 C atoms or a benzyl or phenethyl radical.

Preferred dyestuffs are those of the formula (4) wherein Z forms a radical of the formula

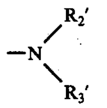

in which $R_2'$ and $R_3'$ independently of one another each denote a hydrogen atom, an optionally substituted phenyl radical, a benzyl radical, a cycloalkyl radical or an alkyl radical with at most 12 C atoms, and the last-named is optionally substituted, especially by a basic group, and can be interrupted by oxygen or sulphur atoms or by groups of the formula

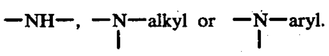

Herein "aryl" is above all phenyl and "alkyl" is particularly $C_1$-$C_4$-alkyl.

A further preferred group is represented by those dyestuffs wherein $R_2'$ and $R_3'$, conjointly with the nitrogen atom linking them, form one of the hetero-rings described above.

Dyestuffs which are also preferred, furthermore, are those wherein Z denotes a radical of the formula $-OR_4'$ in which $R_4'$ is an aryl radical, especially an optionally substituted phenyl radical.

In particularly valuable dyestuffs of the formula (4), D denotes a radical of the benzene series or a heterocyclic radical containing sulphur and/or nitrogen.

According to the invention, the new dyes are manufactured by coupling, condensation or quaternisation. Coupling here also comprises oxidative coupling.

In the manufacture by coupling, the starting materials are diazo and coupling components, at least one component of which already contains a basic group. Thus, diazotized amines of the formula D-$NH_2$ are coupled with coupling components of the formula

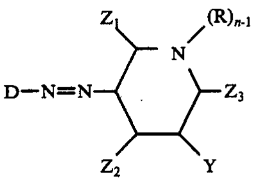

wherein $Z_1$, $Z_2$, $Z_3$, Y, R and $n$ have the meanings given under formula (1).

If $n$ is one, of the coupling components correspond to the formula

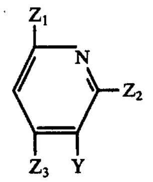

or

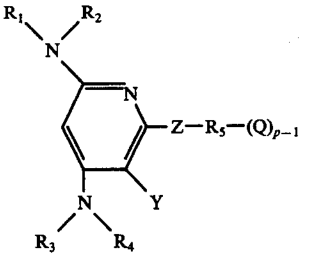

the symbols having the meanings given under the formulae (2) and (3) and if $n$ is 2, they correspond to the formula

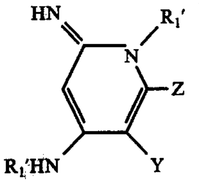

the symbols having the meaning given under formula (4).

If Y is —CN, the cyano group is optionally converted with concentrated sulfuric acid to give the $-CONH_2$ group.

In the sense of an aromatic component, D is derived, for example, form amines of the naphthalene series and particularly form amines of the benzene series. Herein the benzene nucleus can carry, in addition to the basic groups according to the defindition, the following substituents, for example: halogen atoms, such as chlorine, bromine or fluorine, or hydroxyl, nitrile, thiocyano, nitro, lower alkyl, trifluoromethyl, lower alkoxy, lower alkylmercapto, formyl, lower alkylcarbonyl, benzoyl, methylbenzoyl, lower alkoxycarbonyl, lower alkoxycarbonyloxy, benzyloxycarbonyloxy, lower alkylcarbonyl, cyclohexylcarbonyl, phenoxycarbonyl, lower alkoxycarbonyloxy, benzyloxycarbonyloxy, lower alkylcarbonyloxy, benzoyloxy, lower alkylcarbonylamino, benzoylamino, lower alkylsulphonyl, chloroethylsulphonyl, hydroxyethylsulphonyl, unsubstituted aminosulphonyl or aminosulphonyl which is N-mono-substituted or N,N-di-substituted by lower alkyl groups, di($\beta$-hydroxyethyl)aminosulphonyl, phenylaminosulphonyl, (chloro- or methoxy-)phenylaminosulphonyl, benzylaminosulphonyl, N-piperidylsulphonyl, N-morpholinosulphonyl, lower alkylsulphonyloxy, cyclohexylsulphonyloxy, chloromethylsulphonyloxy, cyanoethylsulphonyloxy, phenylsulphonyloxy, aminosulphonyloxy, (chloro- or methoxy-)phenylsulphonyloxy, N-morpholinosulphonyloxy, ethyleneiminosulphonyloxy, lower monoalkylaminosulphonyloxy, dialkylaminosulphonyloxy, phenylaminosulphonyloxy, N-phenyl-N(lower alkyl-)aminosulphonyloxy, N-(methoxy- or chloro-)phenylaminosulphonyloxy, phenylamino, nitrophenylamino, dinitrophenylamino, phenyl, phenoxy and/or acetylaminophenyl groups. D can also denote a phenylazophenyl radical which is optionally substituted by chlorine or bromine atoms or by hydroxyl, nitrile, nitro, lower alkyl, trifluoromethyl, lower alkoxy or phenoxy groups, or a naphthyl radical which is optionally substituted by methoxy, ethoxy, phenylazo or dimethylaminosulphonyl groups. In the sense of a heterocyclic diazo component, D is derived, for example, from a thiazolyl radical which is optionally substituted by chlorine or bromine atoms or by nitro, nitrile, thiocyano, lower alkyl, lower alkoxy, lower alkylmercapto, phenyl, benzyl, phenethyl, lower alkoxycarbonyl, trifluoromethyl, lower alkylcarbonyl and lower alkylsulphonyl groups, a benzthiazolyl radical which is optionally substituted by chlorine or bromine atoms, or by nitrile, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl or aminosulphonyl groups, or a benzthiazolyl radical which is optionally substituted by lower mono- or dialkylaminosulphonyl groups, a pyrazolyl radical which is optionally substituted by nitrile, lower alkyl, lower alkoxy, lower alkoxycarbonyl or phenyl groups, a thiadiazolyl radical which is optionally substituted by lower alkoxy, lower alkyl, phenyl, lower alkylsulphonyl or lower alkylmercapto groups, an imidazolyl radical which is optionally substituted by nitro or lower alkyl groups, a thienyl radical which is optionally substituted by nitro, lower alkyl, lower alkylsulphonyl, lower alkoxycarbonyl or acetyl groups, an isothiazolyl radical which is optionally substituted by lower alkyl, nitro, lower alkylsulphonyl, lower alkoxycarbonyl, nitrile or phenyl groups and a benzisothiazolyl, benzimidazolyl, naphthothiazolyl, quinolinyl or benzoxazolyl, pyridinyl, indazolyl, selenazolyl, oxazolyl, oxdiazolyl or triazolyl radical which is optionally substituted by lower alkyl or nitro groups or by halogen atoms.

The diazo radical D is preferably derived from amines containing a heterocyclic five-membered ring having 2 or 3 hetero-atoms, above all one nitrogen and one or two sulphur, oxygen or nitrogen atoms as the hetero-atoms, particularly from amines of the thiazole, benzthiazole, isothiazole, benzisothiazole and thiadiazole series and from aminobenzenes, above all negatively substituted aminobenzenes, in which the substituents have positive Sigma-values according to the Hammet equation, especially those of the formula

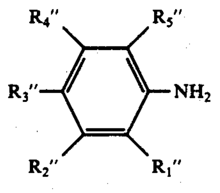

in which $R_1''$ denotes hydrogen, bromine or a thiocyano, alkylsulphonyl, alkoxycarbonyl, hydroxyl, alkylmercapto, arylmercapto, alkoxycarbonyloxy, aminosulphonyloxy or acylamino group or preferably chlorine or a nitro, nitrile, acyl, sulphonamide, carboxylic acid amide, alkoxy or aryloxy group, $R_2''$ denotes hydrogen, bromine or a carboxylic acid amide group or preferably an alkoxycarbonyl or aminosulphonyloxy group, $R_3''$ denotes hydrogen, bromine or a thiocyano, alkoxycarbonyl, alkoxy, aryloxy or acylamino group or preferably chlorine or a nitro, nitrile, acyl, sulphonamide, carboxylic acid amide, trifluoromethyl or phenylazo group, it being possible for the phenyl nucleus of the latter to be substituted in turn by alkyl, alkoxy or nitro groups and by chlorine, $R_4''$ denotes hydrogen, bromine or a nitro, nitrile, thiocyano, acyl, carboxylic acid amide, alkoxy, aryloxy or acylamino group or preferably chlorine or a sulphonamide, alkoxycarbonyl, trifluoromethyl or alkyl group, and $R_5''$ denotes especially hydrogen, chlorine or bromine or a nitro nitrile, thiocyano, acyl, alkoxycarbonyl, trifluoromethyl or alkyl group.

Examples of such acyl radicals are: benzoyl, 4-chlorobenzoyl, 4-methylbenzoyl, benzenesulphonyl, formyl, acetyl, propionyl, chloroacetyl, methylsulphonyl, methoxycarbonyl, ethoxycarbonyl, propoxycarbonyl or butoxycarbonyl radicals.

In particularly valuable dyestuffs of the formula indicated, D denotes a radical of the benzene series or a heterocyclic radical containing sulphur and/or nitrogen and $R_1$ denotes hydrogen.

The basic group according to the definition can be a primary, secondary or tertiary amino group, a hydrazinium group or, advantageously, a quaternary ammonium group. It can be linked direct or via a bridge member to the aromatic or heterocyclic nucleus of the diazo component D. The following bridge members may be mentioned: an alkylene, alkyleneoxy, alkylenecarbonyl, carbonyloxy, carbonylamino, alkylenecarbonyloxy, alkylenecarbonylamino, alkylenesulphonylamino or alkylenesulphonyl group. If the basic group denotes a quaternary ammonium group, it can be the quaternised radical of a nitrogen-containing diazo component or an external trialkylammonium pyridinium, N-methylpiperidinium or N-methylmorpholinium group. If the basic group is located in a radical Z of the coupling component, it is preferably the radical of an aliphatic diamine, such as, for example, the diethylaminoethylamino, dimethylaminopropylamino or piperazino group.

Examples of possible basic groups are those of the formula

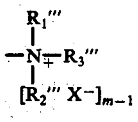

wherein $R_1''$ and $R_2''$ denote hydrogen or alkyl radical, especially with 1–4 C atoms, an aralkyl radical, especially benzyl, or a cycloalkyl radical, especially cyclohexyl, and $R_3''$ denotes hydrogen or an alkyl, aralkyl, cycloalkyl or alkoxy radical or an amino group, and wherein the nitrogen atom can form part of a heterocyclic ring, together with $R_1'''$ and/or $R_2'''$ and/or $R_3'''$. These radicals can be derived, for example, from the amines, hydroxylamines and hydrazines which are mentioned below in the manufacture of the dyestuffs by condensation. X is an anion and *m* is 1 or 2. The anions can be anions of strong inorganic acids, for example, chloride, bromide, iodide, nitrate, sulphate, especially bisulphate, and phosphate, especially dihydrogen phosphate. However, anions of organic acids are also possible, amongst which are understood aryl and alkyl sulphonates and aryl and alkyl carbonates, especially benzenesulphonate and derivatives thereof substituted by nitro groups, chlorine or bromine atoms or $C_1$ to $C_4$-alkyl and $C_1$–$C_4$-alkoxy groups, $C_1$–$C_4$-alkylsulphonates, anions of aliphatic carboxylic acids having 1 to 4 C atoms and benzoates, the benzene ring being able to carry the same substituents as in the case of the benzenesulphonates. Particular importance attaches to the anions of the low molecular alkylsulphuric acid half-esters, that is to say those containing 1 to 4 C atoms. The dyestuffs can also be present as double salts with heavy metal halides, especially with zinc halides and cadmium halides.

Examples of such anions are: benzenesulphonate, p-toluenesulphonate, p-methoxybenzenesulphonate, methanesulphonate, ethanesulphonate, formate, acetate, chloroacetate, propionate, lactate, tartrate, benzoate, methylbenzoate, methylsulphate, ethylsulphate, $ZnCl_3$—, $CdCl_3$—, carbonate and bicarbonate.

Preferred basic radicals are those of the formula indicated, in which $R_1'''$, $R_2'''$ and $R_3'''$ are low molecular alkyl radicals, especially methyl radicals.

In addition, the basic groups can be pyridine radicals

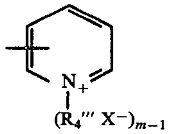

$R_4'''$ being an alkyl radical, especially one with 1 to 4 C atoms, a cycloalkyl radical, especially cyclohexyl, or an aralkyl radical, especially benzyl and X and *m* denoting the same as above.

The expression "lower" before the concepts "alkyl", "alkoxy", "alkylmercapto", "carbalkoxy", "alkoxycarbonyl or alkoxysulphonyl" and "alkylcarbonyl or alkylamino" denotes that these groups have at most 4 carbon atoms.

The diazotisation of the diazo components mentioned can be carried out, for example, with the aid of mineral acid, especially hydrochloric acid, and sodium nitrite or, for example, by means of a solution of nitrosylsulphuric acid in concentrated sulphuric acid.

The coupling can be carried out, for example, in a neutral to acid medium, optionally in the presence of sodium acetate or similar buffer substances which influence the speed of coupling, or catalysts, such as, for example, pyridine or salts thereof.

From the series of diazo components of the benzene series, which can be used, the following examples may be mentioned: aniline, 4-aminophenacyltrimethylammonium chloride, 3-aminophenacyltriethylammonium chloride, 4-aminophenacylhydrazinium bromide, 1-amino-3 or -4-chlorobenzene, 1amino-4-bromobenzene, 1-amino-2-, -3- or -4-methylbenzene, 1-amino-2-, -3- or -4nitrobenzene, 1-amino-4-cyanobenzene, 1-aminobenzene-3- or -4-methylsulphone, 1-amino-2-chlorobenzene-4-methylsulphone, 1-amino-2,5-dicyanobenzene, 1-amino-4-carbethoxybenzene, 1-amino-2,4-or -2,5-dichlorobenzene, 1-amino-2,4-dibromobenzene, 1-amino-2-methyl-4- or -6-chloro-benzene, 4-aminodiphenyl, 2- or 4-aminodiphenyl ether, 3- or 4-aminophthalimide, 1-amino-2-trifluoromethyl-4-chlorobenzene, 1-amino-2-trifluoromethyl-4-chlorobenzene, 1-amino-2-cyano-4-chlorobenzene, 1-amino-2-carboxymethoxy-4-chlorobenzene, 1-amino-2-methylsulphonyl-4-chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-methoxy-4-nitrobenzene, 1-amino-2-chloro-4-carbethoxybenzene, 1-amino-2-bromo-4carbohexoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5-dichloro-4-nitrobenzene, 1-amino-2,5- or 2,6-dichlorobenzene-4-sulphonic acid dimethylamide, 1-aminobenzene-4-sulphonic acid β-chloroethylamide, 1-amino-2-chlorobenzene-4-sulphonic acid dimethylamide, 1-amino-2,6-chlorobenzene-4-sulphonic acid amide, 1-amino-2,4-dinitro-6-chloro- or 6-bromobenzene, 1-amino-2,4-dicyano-6-chlorobenzene, 1-amino-2,4-dicyano-6-chlorobenzene, 1-amino-5-chloro-4-cyano-2-nitrobenzene, 1-amino-2,4,6-trichloro- or tribromobenzene, 1-aminobenzene-3- or -4-sulphonic acid amide, 1-aminobenzene-3- or -4-sulphonic acid N-methylamide or N-diethylamide, 1-amino-2-nitrobenzene-4-sulphonic acid dimethylamide, 1-amino-2-nitrobenzene-4-ethylsulphone, 1-amino-4-nitrobenzene-2-methylsulphone, 1-aminobenzene-4-carboxylic acid methoxyethyl ester, 1-amino-2-nitrobenzene-4-carboxylic acid ethoxyethyl esters, 1-amino-2-cyano-4-nitrobenzene, 1-amino-2-cyano-4-nitro-6-bromobenzene, 1-amino-2,6-dicyano-4-nitrobenzene, 1-amino-2-cyano-4,6-dinitrobenzene and 1-amino-2,4,5-trichlorobenzene.

Ethyl ethers of aminophenols, which contain one of the basic groups mentioned in the β-position of the ethoxy radical and which are derived, for example, from 4-nitro-2-aminophenol, 4,6-dinitro-2-aminophenol, 6-nitro-4-chloro-3-aminophenol, 4-nitro-3-aminophenyl, 5-methanesulphonyl-2-aminophenyl, 5-nitro-2-aminothiophenol and 4-chloro-2-aminophenol-5-sulphonic acid N-methylamide.

Suitable aminoazobenzenes are especially the compounds of the formula

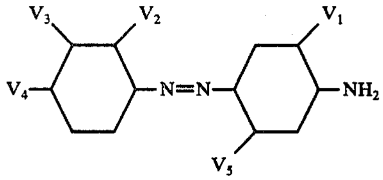

wherein $V_1$ denotes a hydrogen atom, a halogen atom or a methyl, methoxy, ethoxy or nitro group, $V_2$ denotes a hydrogen atom, a halogen atom or a nitro group, $V_3$ denotes a hydrogen atom, a halogen atom or a nitro group, $V_4$ denotes a hydrogen atom, a halogen atom or a methoxy, ethoxy, alkoxycarbonyl, nitrile or nitro group, and $V_5$ denotes a hydrogen atom, a halogen atom or a methyl or methoxy group.

Examples of suitable diazo components of the azobenzene series are 4-aminoazobenzene, 4-amino-2'-chloroazobenzene, 4-amino-2',4'-dichloro-azobenzene, 4-amino-3'-chloro-azobenzene, 4-amino-2'-nitro-azobenzene, 4-amino-3-nitro-azobenzene, 4-amino-3'-nitro-azobenzene, 4-amino-2-methyl-azobenzene, 4-amino-4'-methoxy-azobenzene, 4-amino-3-nitro-2'-chloro-azobenzene, 4-amino-3-nitro-4'-chloro-azobenzene, 4-amino-3-nitro-2',4'-dichloro-azobenzene, 4-amino-3-nitro-4'-methoxy-azobenzene, 4-aminoazobenzene-4'-sulphonic acid dimethylamide and 4-amino-2-methylazobenzene-4'-carboxylic acid ethyl ester.

Example of heterocyclic diazo components which can be used are: 2-aminothiazole, 2-amino-3-methyl-thiazolium chloride, 2-amino-5-nitrothiazole, 2-amino-5-methylsulphonylthiazole, 2-amino-5cyanothiazole, 2-amino-4-methyl-5-nitrothiazole, 2-amino-4-methyl-thiazole, 2-amino-4-phenyl-thiazole, 2-amino-4-(4'-chloro)-phenylthiazole, 2-amino-4-(4'-nitro)-phenyl-thiazole, 3-aminopyridine, 3-aminoquinoline, 3-aminopyrazole, 5-amino-1-phenylpyrazole, 3-aminoindazole, 3-amino-2-methyl-5,7-dinitroindazole, 3-amino-1,2,4-triazole, 3-amino-1-(4'-methoxyphenyl)-pyrazole, 3-amino-5-(methyl-, ethyl-, phenyl- or benzyl)-1,2,4-triazole, 2-aminobenzthiazole, 2-amino-6-methylbenzthiazole, 2-amino-6-methoxybenzthiazole, 2-amino-6-methoxybenzthiazole, 2-amino-6-chlorobenzthiazole, 2-amino-6-cyanobenzthiazole, 2-amino-6-nitrobenzthiazole, 2-amino-6-carboethoxybenzthiazole, 2-amino-6-methylsulphonylbenzthiazole, 2-amino-1,3,4-thiadiazole, 2-amino-1,3,5-thiadiazole, 2-amino-4-phenyl- or -4-methyl-1,3,5-thiadiazole, 5-amino-3-(2'-, 3'- or 4'-pyridyl)-1,2,4-thiadiazole, 2-amino-4-phenyl- or -4-methyl-1,3,5-thiadiazole, 2-amino-4-methylthio-1,3,5-thiadiazole, 2-amino-5-phenyl-1,3,4-thiadiazole, 2-amino-3-nitro-5-methylsulphonylthiophene, 2-amino-3-nitro-5-acetylthiophene, 2-amino-3,5-bis-(methylsulphonyl)thiophene, 5-amino-3-methyl-4-nitroisothiazole, 3-amino-5-nitro-2,1-benzisothiazole, 3-amino-7-bromo-5-nitro-2,1-benzisothiazole, 5-amino-4-nitro-1-methylimidazole, 4-amino-5-bromo-7-nitrobenzisothiazole and 4-amino-7-nitro-benztriazole.

In the case of dyestuffs of the formula (2) or (3), the coupling component is preferably a 3-cyano or 3-carbonamido-4,6-diaminopyridine, which is substituted in the 2-position by aliphatic or aromatic amino groups, alkoxy, aryloxy, alkylmerkapto or arylmercapto groups. The two amino groups in the 4-and 6-position are preferably not further substituted.

In the case of dyestuffs of the formula (4), the coupling component is preferably a 6-amino-3-cyano-1-alkyl-4-alkylaminodihydropyridine which is substituted in the 2-position and which has an imino group in the 2-, 4- or 6-position. Aliphatic or aromatic amino groups, alkoxy, aryloxy, alkylmercapto or arylmercapto groups are attached in the 2-position.

These compounds can be prepared by reacting 2-bromo-3-cyano-4,6-diaminopyridine (in the first case) or 6-amino-2-chloro-3-cyano-1-alkyl-4-alkylamino-dihydropyridine (in the second case) with a primary or secondary amino, or with a hydroxy or mercapto compound.

The following may be mentioned as examples of aromatic amines which can be reacted: naphthylamine, aniline and derivatives thereof, such as 1-amino-3-chlorobenzene, 1-amino-4-carbethoxybenzene, 1-amino-2,4-dicyanobenzene, 1-amino-2-methoxy-4-nitrobenzene, 1-amino-2-methanesulphonyl-4-chlorobenzene, methylaminobenzene, ethylaminobenzene, 1-methylamino-3-chlorobenzene, 1-(2'-chloroethoxy)-2-amino-4-nitrobenzene, 1-(2'-chloroethoxy)-2-amino-4,6-dinitrobenzene, 1-(2'-chloroethoxy)-2-amino-5-methanesulphonylbenzene and 1-(2'-chloroethoxy)-3-amino-4-chloro-6-nitrobenzene.

The following may be mentioned as primary and secondary aliphatic amines which can be used: methylamine, ethylamine, isopropylamine, hexylamine, octylamine, decylamine, methoxyethylamine, methoxypropylamine, isopropoxypropylamine, dimethylamine, dimethylaminopropylamine, diethylamine, chloroethylamine, dimethylaminoethylamine, ethanolamine, diethanolamine, propanolamine, benzylamine or cyclohexylamine, morpholine, pyrrolidine, piperidine, piperazine and 3-picolyamine.

The following may be mentioned as examples of alcohols which can be reacted: ethanol, propanol, isopropanol, butanol, 2-ethoxyethanol, cyclohexanol, benzyl alcohol and phenol and substituted derivatives of the latter.

Ethylmercaptan and thiophenol are examples of mercapto compounds which can be reacted.

Preferred coupling components for the dyestuffs of the formulae (2) and (3) are those 3-carbonamido- or 3-cyano-4,6-diaminopyridines which carry an amino group in the 2-position, in particular a morpholino, pyrrolidino or piperidino group.

The starting products, especially the diaminohalopyridines, are accessible e.g. according to Boldt et al., Angew, Chemie, vol. 82 (1970), page 392, W. J. Middleton, U.S. Pat. No. 2790 806; Sasaki et al., Tetrahedron Letters 1971, page 4593 (cf. Yokoyama Bull. Chem. Soc. Japan, vol. 44 (1971), page 3195).

Preferred coupling components for the dyestuffs of the formula (4) are those 3-carbonamido-dihydropyridines or 3-cyano-(4-amino-6-imino- or 4-imino-6-amino-)-dihydropyridines which carry an amino group in the 2-position, particularly a a morpholino, pyrrolidino or piperidino group.

The starting products, especially the diaminohalogenopyridinium chloride, can be obtained, for example, following A. L. Cossey et al, Angew. Chemie, volume 84 (1972), page 1,184.

Instead of a unitary diazo component, it is also possible to use a mixture of two or more of the diazo components according to the invention and, instead of a unitary azo component, to use a mixture of two or more of the azo components according to the invention.

The 3-cyano group can, if desired, be converted into the 3-$CONH_2$ group by saponification in concentrated sulphuric acid.

If a dye of the formula

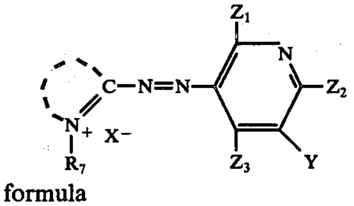

or of the formula

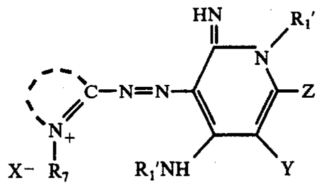

wherein X is an anion and $R_7$ is an alkyl, cycloalkyl or aralkyl radical, is to be manufactured, it is possible to react a hydrazone of the formula

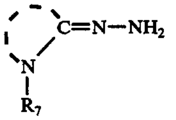

wherein $R_7$ has the same meaning as given hereinbefore, with the coupling components cited hereinabove in the presence of oxidants. The method of oxidative coupling is described in British Pat. No. 1,262,324.

In the manufacture by condensation, a dye of the formula

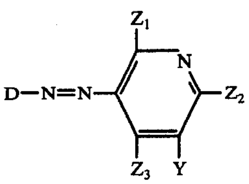

wherein D, $Z_1$, $Z_2$, $Z_3$ and Y have the meanings given under formula (2), but wherein at least one radical Z and/or D contains instead of a basic group a reactive atom or a reactive radical, which latter is able to react with an amine, hydrazine, etherified hydroxylamino or a carboxylic halide, or a dye of the formula

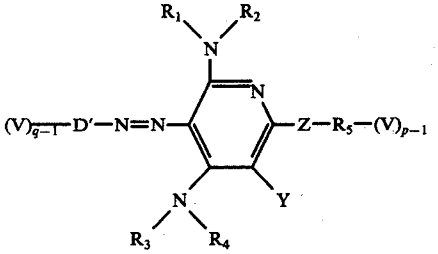

wherein D', $R_1$, $R_2$, $R_3$, $R_4$, $R_5$, Y, Z, $p$ and $q$ have the meanings given under formula (3), but $p + q$ must be at least 3 and V represents a reactive atom or a dyestuff of the formula

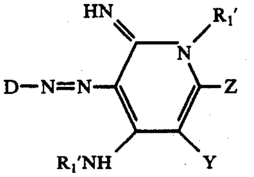

wherein D, Z, $R_1$ and Y have the meaning indicated under formula (4), and in which the radical Z and/or the radical D contains, instead of a basic group, a reactive atom or a reactive radical, is reacted, for example, with an amine, hydrazine, etherified hydroxylamine or pyridinocarboxylic acid chloride or with an optionally quaternary aminocarboxylic acid chloride.

Possible reactive atoms or groups are: halogen atoms, especially chlorine or bromine, benzenesulphonic acid ester groups, such as p-toluenesulphonates and benzenesulphonates, and low-molecular alkylsulphonic acid ester groups and alkylsulphuric half-ester groups, that is to say, groups which contain 1 to 4 carbon atoms, such as dimethylsulphate, and methanesulphonate.

Tertiary amines, hydrazines or hydroxylamines are preferably used for the condensation, since the cationic dyestuffs according to the invention, having quaternary nitrogen atoms, are obtained directly in this way.

The following examples of such compounds may be mentioned: primary and secondary amines, such as methylamine, ethylamine, isopropylamine, methoxyethylamine, methoxypropylamine, dimethylamine, diethylamine, ethylphenylamine, diethanolamine, propanolamine, benzylamine, cyclohexylamine, pyrrolidine, piperidine, piperazine and morpholine, and tertiary amines, such as trimethylamine, triethylamine, dimethylaniline, triethanolamine, pyridine, picoline, lutidine, N-methylpiperidine, N-methylpiperazine, N-methylmorpholine, quinoline or pyrimidine.

Hydrazines, such as N-methylhydrazine, N,N-dimethylhydrazine, N,N'-diethylhydrazine, N,N,N'-trimethylhydrazine, N,N,N,N'-tetramethylhydrazine, N-aminopiperidine, N-aminopyrrolidine and 1,5-diazabicyclo-(0,3,3)-octane.

Etherified hydroxylamines, such as, for example,

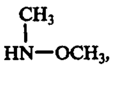 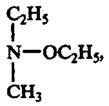 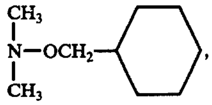,

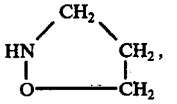 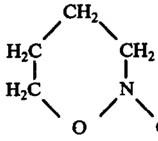,

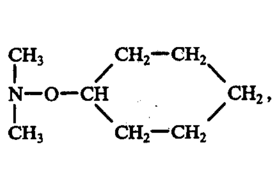 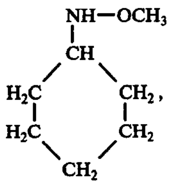

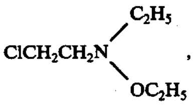, 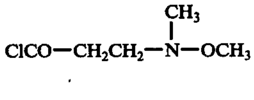 and

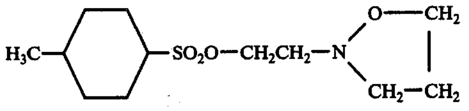

Carboxylic acid chlorides, such as

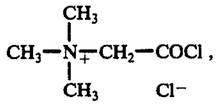 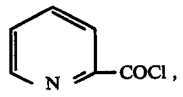

-continued

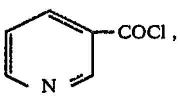 , 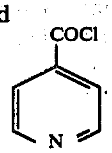

The reaction of the dyestuff, containing, for example, a halogen or sulphatoalkyl group, with the amine, hydrazine or etherified hydroxylamine is carried out in a neutral solvent, for example in chlorobenzene, alcohols or aqueous alcohol mixtures, or dimethylformamide, or even without a solvent, appropriately at elevated temperature in an excess of the hydroxylamine and optionally with the addition of catalysts, for example NaI.

The acylation by means of the carboxylic acid chlorides mentioned of the dyestuffs containing a hydroxyl group or amino group which can be acylated is preferably carried out by methods which are in themselves known in the presence of acid-binding agents, such as alkali metal acetates, bicarbonates and carbonates and alkaline earth metal acetates, bicarbonates and carbonates, or pyridine, in an organic or aqueous organic medium.

Those new dyestuffs which contain a quaternised nitrogen atom can also be obtained, according to a further manufacturing variant, by quaternising corresponding dyestuffs which contain a non-quaternised amino, hydrazino or etherified hydroxylamino group or nitrogen-containing hetercyclic group, by treatment with alkylating agents. The following are examples of such alkylating agents or quaternising agents which can be used: esters of strong mineral acids, especially low molecular sulphuric acid esters, or of organic sulphonic acids, for example dimethyl sulphate or diethyl sulphate, alkyl halides, for example methyl chloride, bromide or iodide, aralkyl halides, for example benzyl chloride, esters of low molecular, that is to say containing 1 to 4 carbon atoms, alkanesulphonic acids, such as, for example, methyl esters of methanesulphonic acid, ethanesulphonic acid or butanesulphonic acid, and esters of benzenesulphonic acids which can contain additional substituents, for example methyl, ethyl, propyl or butyl esters of benzenesulphonic acid, of 2- or 4-methylbenzenesulphonic acid, of 4-chlorobenzenesulphonic acid or of 3- or 4-nitrobenzenesulphonic acid.

The alkylation is suitably carried out by heating in an inert organic solvent, for example hydrocarbons, such as benzene, toluene or xylene, halogenated hydrocarbons, such as carbon tetrachloride, tetrachloroethane, chlorobenzene or o-dichlorobenzene, or nitro-hydrocarbons, such as nitromethane, nitrobenzene or nitronaphthalene. Acid anhydrides, acid amides or nitriles, such as acetic anhydride, dimethylformamide or acetonitrile or even dimethylsulphoxide can also be used as solvents in the alkylation. It is also possible to use a large excess of alkylating agent instead of a solvent. In this case care must, however, be taken that the mixture is not heated excessively, since the reaction is strongly exothermic. Nevertheless, it is necessary in most cases, especially in the presence of organic solvents, to heat the reaction mixture externally in order to start the reaction. In particular cases, the alkylation can also be carried out in an aqueous medium or with the use of an alcohol, possibly in the presence of small quantities of potassium iodide.

If it is necessary, the dyestuff salts are suitably purified by dissolving in water, it being possible, if necessary, to filter off unreacted starting dyestuff as an insoluble residue. The dyestuff can be precipitated again from the aqueous solution by adding water-soluble salts, for example sodium chloride.

The anion of the new dyestuff salts corresponds to the radical split off, unless it is replaced as far as circumstances allow.

The dyestuffs or dyestuff salts according to the invention are suitable for dyeing and printing the most diverse fully synthetic fibres, such as, for example, polyvinyl chloride, polyamide and polyurethane fibres, and also fibres composed of polyesters of aromatic dicarboxylic acids, such as, for example, polyethylene terephalate fibres and, above all, anionically modified polyester and polyamide fibres, but particularly polymers and copolymers composed of acrylonitrile and asymmetric dicyanoethylene.

Polyacrylonitrile fibres are understood above all as polymers containing more than 80%, for example 80 to 95%, of acrylonitrile; additionally they contain 5 to 20% of vinyl acetate, vinylpyridine, vinyl chloride, vinylidene chloride, acrylic acid, acrylic acid esters, methacrylic acid, methacrylic acid esters and the like. These products are sold, for example, under the following brand names: "Acrilan 1656" (The Chemstrand Corp., Decatur, Alabama, USA), "Acrilan 41" (The Chemstrand Corp.), "Creslan" (American Cyanamid Company), "Orlon 44" (DuPont), "Crylor HH" (Soc. Rhodiaceta SA, France), "Leacril N" (Applicazioni Chimice S.p.A., Italy), "Dynel" (Union Carbide Chem. Corp.), "Exlan" (Japan Exlan Industry Co., Japan), "Vonnel" (Mitsubishi, Japan), "Verel" (Tennessee Eastman, USA), "Zefran" (Dow Chemical, USA), "Wolcrylon" (Filmfabrik Agfa, Wolfen), "Ssaniw" (USSR) and also "Orlon 42", "Dralon", "Courtelle" and the like.

The new dyestuffs produce intensive and level dyeings with good fastness to light and good general fastness properties, in particular good fastness to washing, perspiration, sublimation, creasing, decatising, ironing, rubbing, carbonising, water, chlorine water, sea water, drycleaning, cross-dyeing and solvents, on these fibres, which can also be dyed in mixtures with one another. The new dyestuffs according to the invention also have, inter alia, a good stability over a wide pH range, a good affinity, for example in aqueous solutions of various pH values, and a good fastness to kier boiling. Their good capacity for migration is a further advantage. The dyeings are distinguished by brilliant colour shades.

The quaternised, water-soluble dyestuffs are generally not very sensitive to electrolytes and display in part a decidedly good solubility in water or polar solvents. Dyeing by means of the quaternised, water-soluble dyestuffs is generally carried out in an aqueous, neutral or acid medium, at the boil under atmospheric pressure or in a closed vessel at elevated temperature and under elevated pressure.

They can also be applied to the fibre materials by printing. A printing paste containing the dyestuff together with the auxiliary agents customary in printing is used, for example, for this purpose. They are suitable for the mass dyeing of polymerisation products of acrylonitrile, as also of other plastic, optionally dissolved, compositions in colour shades which are fast to light and washing, and also for dyeing oil paints or lacquers, or, finally, also for dyeing paper and mordanted cotton.

Those new, basic dyestuffs which contain, as the basic group, a primary, secondary or tertiary nitrogen atom and which are insoluble or sparingly soluble in water, are appropriately used in a finely divided form and with the addition of dispersing agents, such as soap, sulphite cellulose waste liquor or synthetic detergents, or a combination of various wetting agents and dispersing agents. As a rule it is advisable to convert these dyestuffs, before dyeing, into a dye preparation containing a dispersing agent and finely divided dyestuff in such a form that a fine dispersion is formed on diluting the dyestuff preparations with water. Such dyestuff preparations can be obtained in a known manner, for example by grinding the dyestuff in high efficiency grinding equipment in the dry or wet form, with or without the addition of dispersing agents during the grinding process. They are also suitable for dyeing and printing the most diverse semi-synthetic and fully synthetic fibres, such as, for example, cellulose acetate, polyolefine, for example modified polypropylene, polyester, polyvinyl chloride, polyamide or polyurethane fibres, but especially fibres composed of polyacrylonitrile.

In order to achieve strong dyeings, it is found appropriate to carry out the dyeing process at elevated temperatures, for example at the boil. It is advantageous to add a dispersing agent and to make the dyebath weakly acid, for example by the addition of a weak acid, for example acetic acid.

The present dyestuffs can also be applied by printing. For this purpose use is made, for example, of a printing ink containing, in addition to the auxiliary agents customary in printing, such as wetting agents and thickeners, the finely dispersed dyestuff, if appropriate mixed with other dyestuffs.

In the following examples, unless indicated otherwise, the parts denote parts by weight and the percentages denote

INSTRUCTION 1

10.55 g of 2-bromo-3-cyano-4,6-diaminopyridine, 10 parts of alcohol and 16 parts of 70% aqueous ethylamine are heated for 4 hours in an autoclave at 100° C. Excess amine and the remaining volatile constituents are evaporated in vacuo and the residues, which contains the compound of the formula

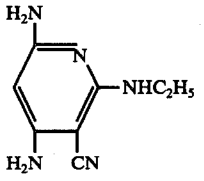

is used as coupling component without further purification.

INSTRUCTION 2

10.65 parts of 2-bromo-3-cyano-4,6-diaminopyridine and 24 parts of aniline are heated for 4 hours at 140° C. The mixture is cooled, the pH adjusted to 7–8 with sodium hydroxide solution, and excess aniline is expelled with steam. The precipitated product of the formula

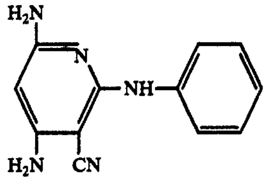

is isolated and used as coupling component without further purification. A yellow powder with a melting point of 147° C is obtained.

INSTRUCTION 3

4.26 parts of 2-bromon-3-cyano-4,6-diaminopyridine are dissolved hot in 120 parts of methyl alcohol. 3 parts of sodium methylate are added and the mixture is boiled under reflux until no more starting material can be detected in a thin-layer chromatogram. The solvent is removed in vacuo, the residue stirred with ice water, the insoluble product isolated by filtration, and the crystalline, yellow filter cake is washed with cold water and dried. The compound has the formula

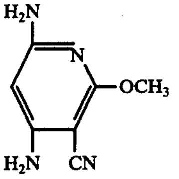

and a melting point of 174° C.

INSTRUCTION 4

6.4 parts of 2-bromo-3-cyano-4,6-diaminopyridine, 14.5 parts of phenol and 2.5 parts of potassium carbonate are heated at 140° C until no more starting material can be detected in a thin-layer chromatogram. The mixture is poured into water and the pH adjusted to 9 with sodium hydroxide solution. The precipitated compound of the formula

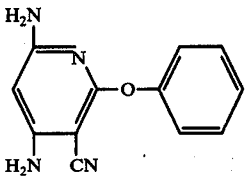

is filtered off, washed with water and dried. The melting point is 176° C.

INSTRUCTION 5

8.4 parts of 2-chloro-3-cyano-4,6-diaminopyridine and 20 parts of 3-dimethylamino-1-proplyamine are heated at 100° C for 6 hours. Dxcess amine is evaporated in vacuo and the viscous residue, which contains the compound of the formula

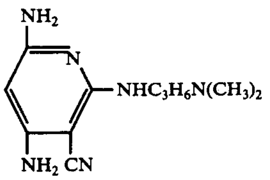

is used as coupling component.

INSTRUCTION 6

4.66 g of 6-amino-2-chloro-3-cyano-1-methyl-4-methylaminopyridinium chloride, 10 ml of ethanol and 10 ml of 35% strength aqueous methylamine are heated to 180° C in an autocalve for 10 hours. After cooling, 2 g of sodium carbonate are added and the excess amine and the other volatile constituents are removed by steam distillation. The residue is extracted with chloroform, the extract is dried with calcined sodium sulphate and the solvent is then distilled off in vacuo. The residue, which can be represented by the formula

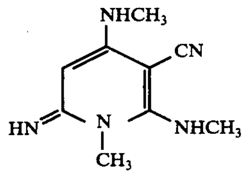

and which is produced as a pale yellow powder, can be used direct as a coupling component.

INSTRUCTION 7

4.66 g of 6-amino-2-chloro-3-cyano-1-methyl-4-methylaminopyridinium chloride, 10 ml of ethanol and 8.5 g of piperidine are heated to 130° C in an autoclave for 12 hours. After cooling to room temperature, 2 g of sodium carbonate are added and the excess amine and the other volatile constituents are removed by steam distillation. The residue is extracted with chloroform. The chloroform extract is dried using calcined sodium sulphate and the solvent is then distilled off in vacuo. The residue, which can be represented by the formula

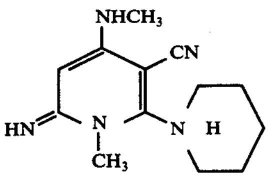

and which is produced as a viscous, colourless oil, can be used direct as a coupling component.

INSTRUCTION 8

4.66 parts of 6-amino-2-chloro-3-cyano-1-methyl-4-methylaminopyridinium chloride and 12 parts of aniline are heated to 160° - 170° C for 12 hours. After cooling, 4 parts of sodium carbonate are added and the excess amine is removed by steam distillation. The precipitated product is filtered off, washed with cold water until neutral and dried. The pale brown coloured powder, which can be represented by the formula

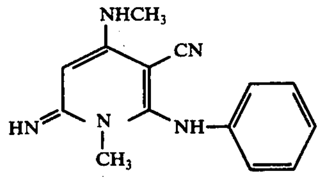

is used as a coupling component.

INSTRUCTION 9

7 parts of 6-amino-2-chloro-3-cyano-1-methyl-4-methylaminopyridinium chloride, 21 parts of phenol and 3.5 parts of potassium carbonate are heated to 160° - 170° C for 24 hours. After cooling, the reaction mixture is rendered alkaline to phenolphthaleine with 2 N sodium hydroxide solution and the precipitated product is filtered off, washed with water and dried. The brown powder is extracted with hot acetone. The extract is separated off and the solvent is distilled off in vacuo. The residue thus obtained, which can be represented by the formula

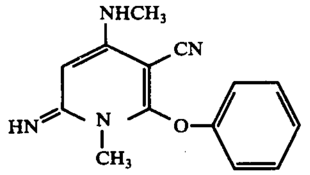

and which is produced as a pale brown coloured powder, is used as a coupling component.

If, instead of phenol, the corresponding amount of thiophenol is employed, the corresponding thio product is obtained.

INSTRUCTION 10

62.4 parts of cyanoacetic acid methoxypropylamide are dissolved in 125 parts by volume of chloroform and 61.4 parts of phosphorus oxychloride are added dropwise at 50° to 55° C. The mixture is heated under reflux for 12 hours. The solvent is then distilled off in vacuo and the residue is treated with 30 parts by volume of methyl alcohol. The viscous mass is stirred for 3 to 4 hours at 0° to 5° C until crystallisation is complete. The product is filtered off, washed with a little cold methyl alcohol and is well pressed down on the filter. The pale yellow coloured crystals thus obtained, of melting point 160° to 165° C, which correspond to the formula

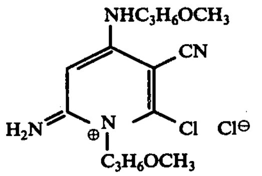

are used for the preparation of the coupling components.

INSTRUCTION 11

66.4 parts of cyanoacetic acid cyclohexylamide are dissolved in 200 parts by volume of chloroform and 61.4 parts of phosphorus oxychloride are added dropwise at 50° to 55° C. The mixture is heated under reflux for 12 hours. The solvent is then distilled off in vacuo and the residue is treated with 100 parts by volume of methyl alcohol. After stirring for 2 to 3 hours, the product which has crystallised out is filtered off and washed with cold methyl alcohol. Recrystallised from methyl alcohol, the pale yellow product has a melting point of 195° to 196° C and corresponds to the formula

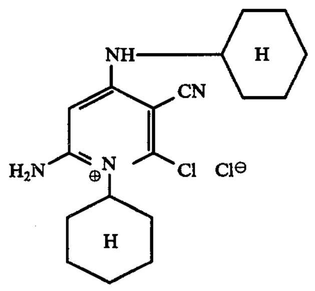

It is used for the preparation of the coupling components.

INSTRUCTION 12

75.2 parts of cyanoacetic acid phenylethylamide are dissolved in 200 parts by volume of chloroform and 61.4 parts of phosphorus oxychloride are added dropwise at 50° to 55° C. The mixture is heated under reflux for 12 hours. The solvent is then distilled off in vacuo and the residue is treated with 30 parts by volume of methyl alcohol. After stirring for 3 hours at 5° to 10° C, the product which has crystallised out is filtered off and washed with cold methyl alcohol. Recrystallised from methyl alcohol, the pale yellow product has a melting point of 234° to 235° C and corresponds to the formula

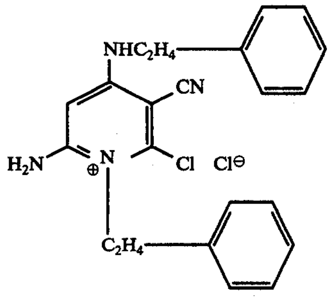

It is used for the preparation of the coupling components.

INSTRUCTION 13

10.5 parts of 6-amino-2-chloro-3-cyano-1-methoxypropyl-4-methoxypropylaminopyridinium chloride, 15 parts of alcohol and 26.6 parts of 35% strength methylamine solution are heated to 170° C in an autoclave for 12 hours. After cooling, 3 parts of sodium carbonate are added and the excess amine and the other volatile constituents are removed by steam distillation. The residue is extracted with chloroform, the extract is dried with calcined sodium sulphate and the solvent is distilled off in vacuo. The residue, which can be represented by the formula

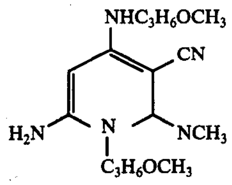

and which is produced as a viscous oil, is used as a coupling component.

INSTRUCTION 14

9.8 parts of cyanoacetic acid methylamide are dissolved in 50 parts by volume of warm chloroform. The mixture is then cooled and 28.7 parts of phosphorus oxybromide are added. The reaction mixture is slowly warmed to 60° C and is heated under reflux for 12 hours. The suspension is cooled to 0° - 5° C and filtered. The residue is recrystallised from methyl alcohol. The yellow product, which has a melting point of 242° to 244° C and corresponds to the formula

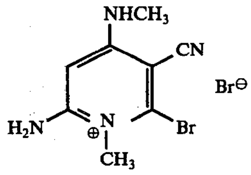

can be reacted with nucleophilic agents to give coupling components, analogously to the chlorine product.

INSTRUCTION 15

7 parts of 6-amino-2-chloro-3-cyano-1-methyl-4-methylaminopyridinium chloride, 15 parts of alcohol and 15.3 parts of 3-dimethylamino-1-propylamine are heated at 170° - 180° C in an autoclave for 12 hours.

The mixture is cooled, 3 parts of sodium carbonate are added and the excess amine and the other volatile constituents are removed by steam distillation. The residue is extracted with chloroform. The chloroform extract is dried with calcined sodium sulphate and the solvent is then distilled off in vacuo. The residue, which can be represented by the formula

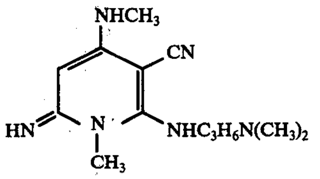

and which is produced as a viscous, brown oil, is used as a coupling component.

EXAMPLE 1

4.57 parts of 4-aminophenacyltrimethylammonium chloride (obtained by reacting 4-aminophenacyl chloride with trimethylamine) are dissolved in 20 parts of water and the whole solution is treated with 8 parts by volume of concentrated hydrochloric acid. The solution is diazotised at 0°–5° C by addition of 5 parts by volume of 4N sodium nitrite solution. The diazo solution is added at 0°–5° C to a solution of 4.5 parts of 2-anilino-3-cyano-4,6-diaminopyridine in 30 parts of alcohol. The coupling mixture is made neutral by addition of sodium acetate solution. Upon completion of the coupling the mixture is diluted with 10% sodium chloride. The dye is filtered off, dissolved in hot water and, after the solution has been filtered salted out from the filtrate. The precipitated dye of the formula

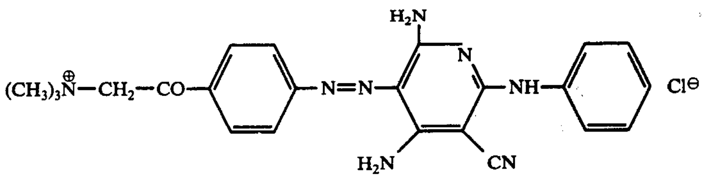

is filtered off and dried. It dyes polyacrylonitrile fibres in reddish yellow shades of excellent fastness properties.

EXAMPLE 2

3.54 parts of 5-amino-3-phenyl-1,2,4-thiodazole are dissolved in 20 parts by volume of formic acid. 1.4 parts of sodium nitrite are added at 0° to 5° C and the mixture is stirred for 30 minutes. Then 0.05 parts of sulphamic acid are added. Subsequently 6.9 parts of 3(3'-cyano-4',6'-diamino-pyridine-2')-aminopropyl-1-trimethylammonium methosulphate are added and the batch is rinsed with 10 parts by volume of formic acid. The mixture is heated slowly to 60° C and stirred at this temperature for 2 hours. The paste is diluted with water and dissolved hot. The solution is filtered and the product is salted out from the filtrate with sodium and zinc chloride.

The precipitated dye of the formula

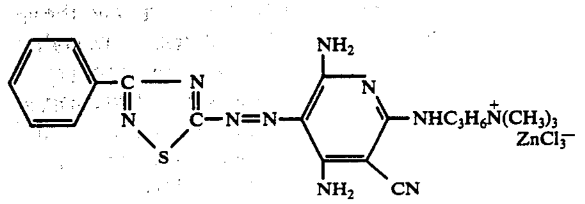

is filtered off and dried. It dyes polyacrylonitrile fibres in reddish yellow shades of very good fastness properties.

The coupling component is obtained by alkylation of the intermediate product described in Direction 5 with dimethyl sulphate in a solution of chlorobenzene.

Further dyes of the formula

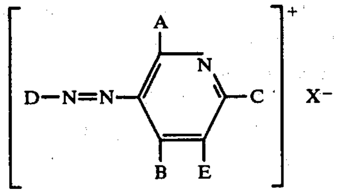

wherein the symbols D, A, B, C, E and X have the meanings given in Table 1, are obtained in analogous manner.

Table 1
| D | A | B | C | E | X | Shade |
|---|---|---|---|---|---|---|
| 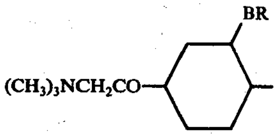 | $NH_2$ | $NH_2$ | piperidyl | CN | Br | golden yellow |
| 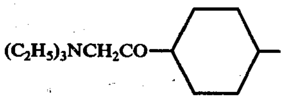 | $NH_2$ | $NH_2$ | $NHC_6H_5$ | CN | Cl | golden yellow |
| 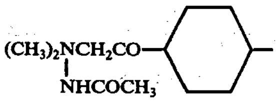 | $NH_2$ | $NH_2$ | $NHC_2H_4OC_6H_5$ | CN | Cl | yellow |
| 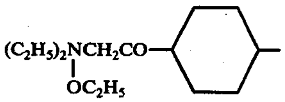 | $NH_2$ | $NH_2$ | $N(C_4H_9)_2$ | CN | Cl | golden yellow |
| 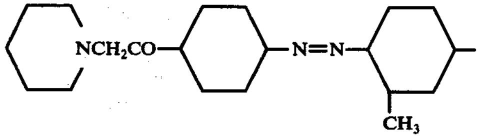 | $NH_2$ | $NH_2$ | $NHCH_2CON(CH_3)_2$ | CN | Cl | orange |
| 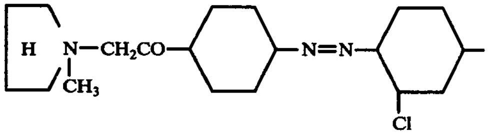 | $NH_2$ | $NH_2$ | $OCH_3$ | CN | $CH_3COO$ | golden yellow |
| 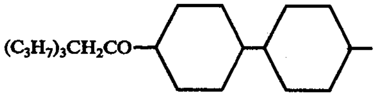 | $NH_2$ | $NH_2$ | $NHC_2H_4OH$ | CN | Cl | yellow |
| 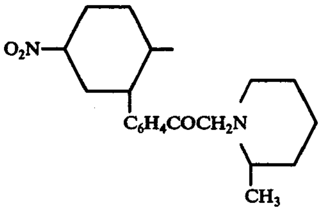 | $NH_2$ | $NH_2$ | $NHC_4H_9$ | CN | Cl | orange |

Table 1-continued
| D | A | B | C | E | X | Shade |
|---|---|---|---|---|---|---|
| 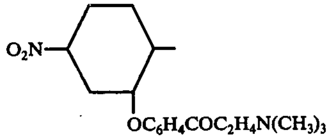 | $NH_2$ | $NH_2$ | $NHC_6H_4Cl(m)$ | CN | Br | orange |
| 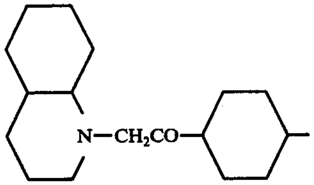 | $NH_2$ | $NH_2$ | $SC_6H_5$ | CN | Cl | yellow |
| 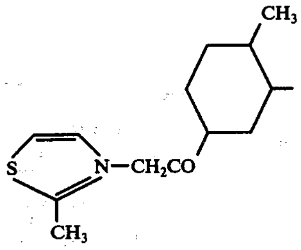 | $NH_2$ | $NH_2$ | $OCH(CH_3)_2$ | CN | Br | yellow |
| 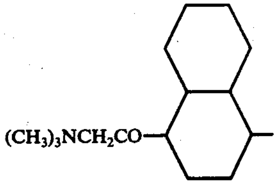 | $NHC_4H_8OH$ | $NHCH(CH_3)_2$ | $NHCH(CH_3)_2$ | CN | Cl | orange |
| 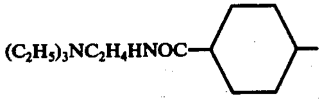 | $NH_2$ | $NH_2$ | $NHC_6H_4CH_3(p)$ | CN | I | golden yellow |
| 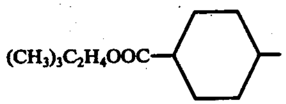 | $NH_2$ | $NH_2$ | $N(CH_3)_2$ | CN | $CH_3SO_4$ | golden yellow |
| 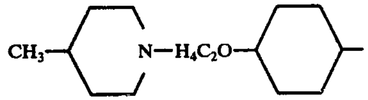 | $NH_2$ | $NH_2$ | $NHC_2H_4Cl$ | CN | $C_7H_7SO_3$ | yellow |

Table 1-continued
| D | A | B | C | E | X | Shade |
|---|---|---|---|---|---|---|
| 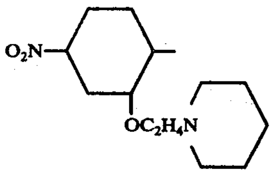 | $NH_2$ | $NH_2$ | $NHC_2H_4C_6H_5$ | CN | $CH_3SO_3$ | orange |
| 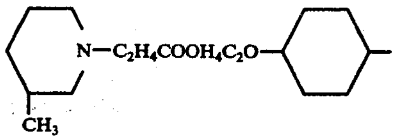 | $NH_2$ | $NHC_6H_5$ | $NHC_6H_5$ | CN | Cl | yellow |
| 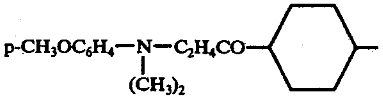 | $SCH_3$ | $NHC_2H_5$ | $NHC_2H_5$ | CN | ⅓ $PO_4$ | yellow |
| 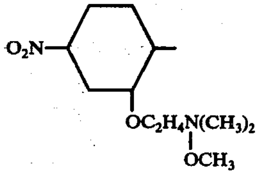 | $NH_2$ | $NH_2$ | $OC_6H_5$ | CN | $CH_3SO_3$ | yellow |
| 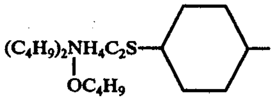 | $NH_2$ | $NH_2$ | NH-cyclohexyl | CN | $HSO_4$ | yellow |
| 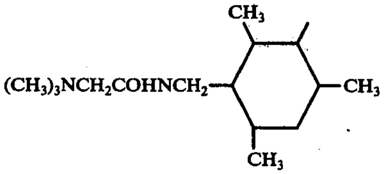 | $NH_2$ | $NH_2$ | $SC_2H_5$ | CN | Cl | yellow |
| 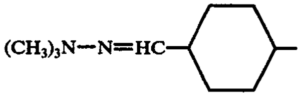 | $NH_2$ | $NH_2$ | $NHC_6H_{13}$ | CN | $CH_3SO_4$ | yellow |
| 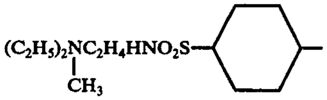 | $NH_2$ | $NH_2$ | pyrrolidinyl | CN | I | orange |

Table 1-continued
| D | A | B | C | E | X | Shade |
|---|---|---|---|---|---|---|
| 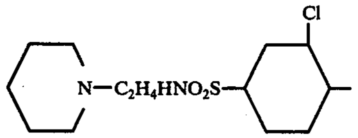 | $NH_2$ | $NH_2$ | $OC_2H_4C_6H_5$ | CN | Cl | yellow |
| 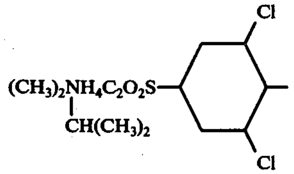 | $OC_6H_5$ | $NHC_2H_5$ | $NHC_2H_5$ | CN | Cl | yellow |
| 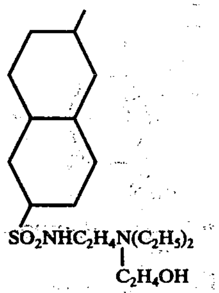 | $N(CH_3)_2$ | $N(CH_3)_2$ | $N(CH_3)_2$ | $CONH_2$ | Cl | orange |
| 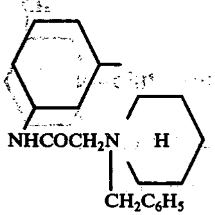 | $NHCH_3$ | $NHC_3H_6OCH(CH_3)_2$ | $NHC_3H_6OCH(CH_3)_2$ | CN | Cl | yellow |
| 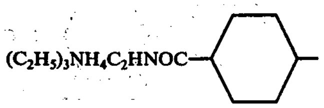 | $NHC_4H_9$ | $SC_2H_5$ | $NH_2$ | CN | Cl | yellow |
| 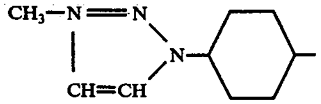 | $NH_2$ | $NH_2$ | $NHC_8H_{17}$ | CN | $CH_3SO_4$ | yellow |

Table 1-continued
| D | A | B | C | E | X | Shade |
|---|---|---|---|---|---|---|
| 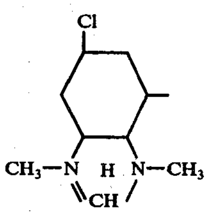 | $NH_2$ | $NH_2$ | $NHC_3H_6OC_2H_5$ | CN | $CH_3SO_4$ | yellow |
| 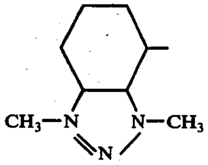 | $NHC_6H_5$ | $NHC_2H_5$ | $NHC_2H_5$ | CN | $CH_3SO_4$ | yellow |
| 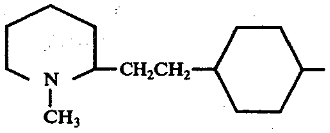 | $NH_2$ | $NH_2$ | morpholino | CN | I | yellow |
| 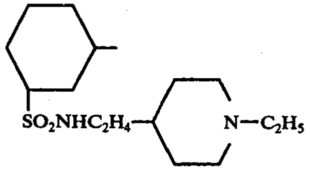 | NH-cyclohexyl | $NHCH(CH_3)_2$ | $NHCH(CH_3)_2$ | $C_2H_5SO_4$ | | yellow |
| 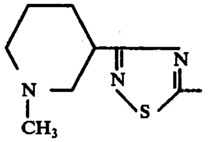 | $OCH_3$ | $NHCHC_2H_5$<br>$CH_3$ | $NHCHC_2H_5$<br>$CH_3$ | CN | ½ $SO_4$ | yellow |
| 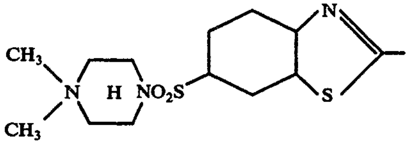 | $SC_6H_5$ | $NHCH_3$ | $NHCH_3$ | CN | $C_6H_5SO_3$ | yellow |

Table 1-continued

| D | A | B | C | E | X | Shade |
|---|---|---|---|---|---|---|
| 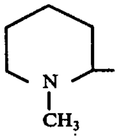 | $NH_2$ | $NH_2$ | $N(C_2H_5)_2$ | CN | $CH_3SO_4$ | orange |
| 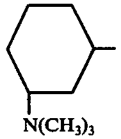 | $NH_2$ | $NH_2$ | $OC_6H_4CH_3$(m) | CN | $CH_3SO_4$ | yellow |
| 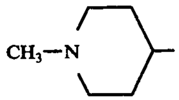 | $NHC_2H_4C_6H_5$ | $NHC_2H_5$ | $NHC_2H_5$ | CN | Br | orange |
| 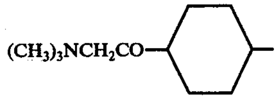 | $NH_2$ | $NH_2$ | $NHC_6H_{13}$ | $CONH_2$ | Cl | golden yellow |
| 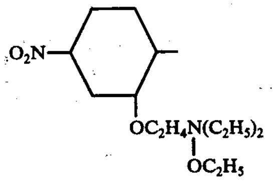 | $N(CH_3)_2$ | $NHC_2H_5$ | $NHC_2H_5$ | $CONH_2$ | $C_2H_5SO_4$ | orange |
| 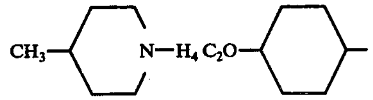 | $NH_2$ | $NHC_6H_5$ | $NHC_6H_5$ | $CONH_2$ | $C_6H_5SO_3$ | yellow |
| 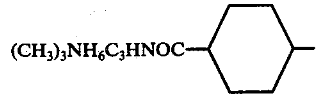 | $NHC_4H_9$ | $N(CH_3)_2$ | $N(CH_3)_2$ | $CONH_2$ | $C_7H_7SO_3$ | reddish yellow |
| 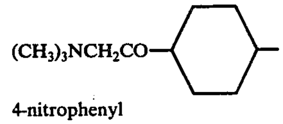 | $NH_2$ | $NH_2$ | $NHC_3H_6N(CH_3)_3$ | $CONH_2$ | Cl | reddish yellow |
| 4-nitrophenyl | $NH_2$ | $NH_2$ | $NHC_3H_6N(CH_3)_2$<br>$CH_2C_6H_5$ | CN | Cl | orange |
| 5-nitrothiazolyl-2- | $NH_2$ | $NH_2$ | $NHC_3H_6N(CH_3)_2$<br>$C_2H_5$ | CN | $C_2H_5SO_4$ | deep purplish red |

Table 1-continued

| D | A | B | C | E | X | Shade |
|---|---|---|---|---|---|---|
| 4-nitro-2-trifluoromethyl-phenyl | 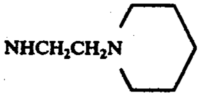 | $N(CH_3)_2$ | $N(CH_3)_2$ | CN | Cl | scarlet |
| 4(4'-nitrophenyl-)azophenyl | $NH_2$ | $NH_2$ | 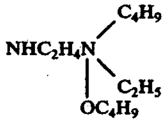 | CN | Br | orange |
| 2-chloro-4-nitrophenyl |  | $N(C_2H_5)_2$ | $N(C_2H_5)_2$ | CN | $CH_3SO_3$ | scarlet |
| 2,5-dichloro-4-dimethylamino sulphonylphenyl | $NH_2$ | $NH_2$ | $NHC_6H_4OC_2H_4N(CH_3)_3$(-p) | CN | $CH_3SO_4$ | orange |
| 4-phenylazophenyl | 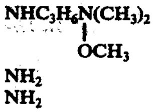 | $N(CH_3)_2$ | $N(CH_3)_2$ | CN | $C_6H_5SO_3$ | golden yellow |
| 4-nitro-2-thiocyanophenyl | $NH_2$ | $NHC_3H_6N(CH_3)_3$ | NH-cyclohexyl | CN | $CH_3SO_4$ | orange |
| 5-nitro-7-bromo-2,1-benz-isothiazolyl-3 | $NH_2$ | $NH_2$ | $SC_2H_4N(C_2H_5)_3$ | CN | Br | red |
| 4-chloro-2-trifluoromethyl-phenyl | 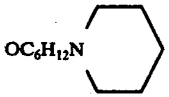 | morpholino | morpholino | CN | $C_7H_7SO_3$ | yellow |
| 2,6-dichloro-4-nitrophenyl | $NH_2$ | $NH_2$ | $NHC_2H_4N(C_2H_5)_3$ | CN | I | orange |
| 5-acetyl-3-nitrothiophenyl | 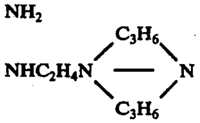 | $N(CH_3)_2$ | $N(CH_3)_2$ | CN | $CH_3SO_3$ | deep purplish red |
| 3-butylthio-1,2,4-thia-diazolyl-5- | $NH_2$ | $NHC_2H_4N(C_2H_5)_3$ | $NHC_6H_5$ | CN | Br | reddish yellow |
| 4-(2'-hydroxy-5'-methyl-phenyl-) azophenyl | $NH_2$ | $NH_2$ |  | CN | Br | orange |
| 6-methylsulphonylbenzthia-zolyl-2- | $NHC_2H_4OCOCH_2(CH_3)_3$ | $N(CH_3)_2$ | $N(CH_3)_2$ | CN | Cl | scarlet |
| 1-anthraquinonyl | $NH_2$ | $NH_2$ | 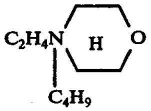 | CN | ⅓ $PO_4$ | scarlet |
| 5-chloro-2-methylthio-phenyl | 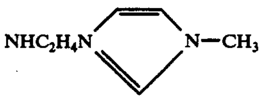 | piperidino | piperidino | CN | Cl | yellow |
| 2-ethoxycarbonyl-4-nitrophenyl | $NH_2$ | $NH_2$ | $NHC_6H_4NHCOCH_2N(CH_3)_3$(-m) | CN | $HSO_4$ | scarlet |

Table 1-continued

| D | A | B | C | E | X | Shade |
|---|---|---|---|---|---|---|
| 1-naphthyl | 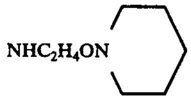 | $N(CH_3)_2$ | $N(CH_3)_2$ | CN | $CH_3SO_3$ | orange |
| 6-chloro-2,4-dinitro phenyl | $NHCH_3$ | $SC_2H_4N(C_2H_5)_3$ | $NH_2$ | CN | $C_2H_5SO_4$ | orange |
| 6-bromo-2-cyano-4-nitro-phenyl | $NH_2$ | $NH_2$ | 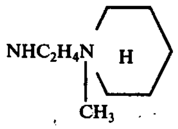 | CN | Cl | deep purplish red |
| 1-methyl-4-nitroimida-zolyl-5- | $NHC_3H_6N(CH_3)_2$ with $C_2H_4OH$ | $NHCH(CH_3)_2$ | $NHCH(CH_3)_2$ | CN | ½ $SO_4$ | scarlet |
| 2-methoxy-5-nitrophenyl | $NH_2$ | $NHC_3H_6N(CH_3)_3$ | $NHC_2H_4C_6H_5$ | CN | $CH_3SO_4$ | yellow |
| 2,6-dichloro-4-aminosul-phonylphenyl | $NH_2$ | $NH_2$ | $NHC_6H_4CH_2N(CH_3)_{3(-p)}$ | CN | Cl | orange |
| 4-azophenyl-2-nitro-phenyl | $NHC_4H_8N(C_2H_5)_2$ with $NH_2$ | $N(CH_3)_2$ | $N(CH_3)_2$ | CN | Cl | red |
| 2,4-dicyanophenyl | $NH_2$ | $NH_2$ | 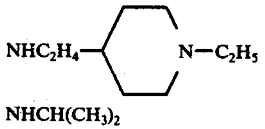 | CN | $C_2H_5SO_4$ | orange |
| 1-phenyl-3-methylpyra-zolyl-5 | $OC_2H_4N(C_2H_5)_3$ | $NHCH(CH_3)_2$ | $NHCH(CH_3)_2$ | CN | Br | yellow |
| 5,6-dichlorobenzthia-zolyl-2 | $NH_2$ | $NH_2$ | 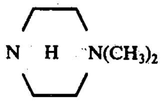 | CN | $CH_3SO_4$ | orange |
| 3-methyl-4-nitro-1,2-isothiazolyl-5 | $NHC_2H_4N(CH_3)_2$ with $C_6H_4OCH_3$(-p) | pyrrolidino | pyrrolidino | CN | $C_7H_7SO_3$ | deep purplish red |
| 5-thiocyanothiazolyl-2 | $NH_2$ | $NHC_3H_6N(CH_3)_3$ | $NHC_3H_6N(CH_3)_3$ | CN | $CH_3SO_4$ | orange |
| 2-methyl-4-nitrophenyl | $NH_2$ | $NH_2$ | $OC_2H_4N(C_2H_5)_3$ | CN | $C_2H_5SO_4$ | yellow |
| 4-pyrrolidinocarbonyl-phenyl | $NHC_2H_4(C_2H_5)_3$ | $NHC_2H_5$ | $NHC_2H_5$ | $CONH_2$ | ½ $SO_4$ | yellow |
| 2,4-dinitrophenyl | $NH_2$ | $NH_2$ | $NHC_3H_6N(CH_3)_3$ | CN | Cl | red |
| 4-(4'-chlorophenyl)azo-2 methoxy-5-methylphenyl | 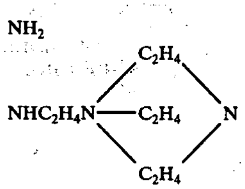 | $N(CH_3)_2$ | $N(CH_3)_2$ | CN | Cl | scarlet |

Table 1-continued

| D | A | B | C | E | X | Shade |
|---|---|---|---|---|---|---|
| 4-methoxy-2-nitrophenyl | $NH_2$ | $NH_2$ | 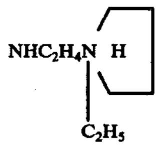 | CN | $CH_3COO$ | orange |
| 2-methyl-5-nitrophenyl | 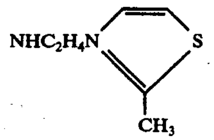 | $N(C_2H_5)$ | $N(C_2H_5)_2$ | CN | Cl | yellow |
| 4-methylaminosulphonyl-phenyl | $NH_2$ | $NH_2$ | $NHC_2H_4N(C_2H_5)_2$<br>$C_2H_4C_6H_5$ | CN | Br | orange |
| 5-phenyl-1,3,4-thiadia-zolyl-2 | 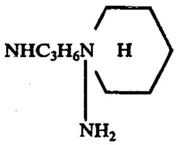 | $N(CH_3)_2$ | $N(CH_3)_2$ | CN | Cl | reddish yellow |
| 2-ethoxy-4-nitrophenyl | $NH_2$ | $NH_2$ | 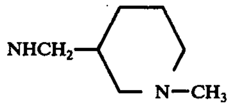 | CN | $C_7H_7SO_3$ | orange |
| 4-phenoxycarbonylphenyl | 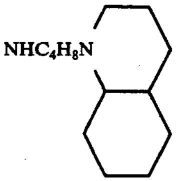 | $N(CH_3)_2$ | $N(CH_3)_2$ | $CONH_2$ | Cl | reddish yellow |
| 3-phenyl-1,2,4-thiadia-zolyl-5 | $NH_2$ | $NH_2$ | $NHC_6H_{12}N(CH_3)_3$ | $CONH_2$ | I | golden yellow |
| 2,6-dibromo-4-nitro-phenyl | $NH_2$ | $NH_2$ | $SC_2H_4N(C_2H_5)_3$ | CN | ⅓ $PO_4$ | yellow |
| 2,4,5-trichlorophenyl | $NH_2$ | $NH_2$ | $NHC_2H_4N(CH_3)_2$<br>$OCH_3$ | CN | $HSO_4$ | yellow |
| 1-methylbenzotriazolyl-4- | $NHC_6H_4CH_2N(C_2H_5)_3$(m) | $NHC_2H_5$ | $NHC_2H_5$ | CN | Cl | yellow |
| 2-cyano-4-nitrophenyl | $NH_2$ | $NH_2$ | $NHC_3H_6N(CH_3)_2$<br>$C_2H_5$ | CN | $C_2H_5SO_4$ | scarlet |

Table 1-continued

| D | A | B | C | E | X | Shade |
|---|---|---|---|---|---|---|
| 5-nitro-indazolyl-3 | $NHC_2H_4OCO$— 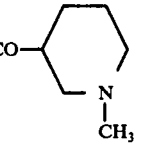 | $N(CH_3)_2$ | $N(CH_3)_2$ | CN | Cl | orange |
| 2,6-dicyano-4-nitrophenyl | $NH_2$ | $NH_2$ | $NHC_3H_6N(C_2H_5)_2$ with $OC_2H_5$ | CN | $HCO_3$ | deep purplish red |
| 5-methyl-1,2-isoxazolyl-3 | $SC_2H_4N(CH_3)_2$ with $C_2H_4CONH_2$ | $NHCH(CH_3)_2$ | $NHCH(CH_3)_2$ | CN | Cl | yellow |
| 2,4,6-tribromo-pheyl | $NH_2$ | $NH_2$ | $NHC_3H_6N(CH_3)_3$ | $CONH_2$ | $CH_3SO_4$ | yellow |
| 5-chloro-2-phenoxy-phenyl | $SC_4H_8N(C_2H_5)_2$ with $OC_2H_5$ | $N(C_2H_5)_2$ | $N(C_2H_5)_2$ | CN | $C_6H_5SO_3$ | yellow |
| 5-nitro-2,1-benziso-thiazolyl-3 | $NH_2$ | $NH_2$ | $NHC_2H_4N(C_2H_5)_3$ | CN | Cl | deep purplish 79 purplish |
| 4-phenyl-3-ni-trophenyl | $OC_2H_4ON$ 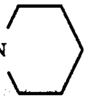 | $N(CH_3)_2$ | $N(CH_3)_2$ | CN | $CH_3SO_3$ | yellow red |
| 4-butylsulphonyl-phenyl | $NH_2$ | $NH_2$ | 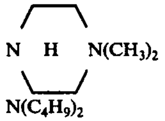 | CN | Cl | orange |
| 2-cyano-4,6-dinitro-phenyl | $SC_2H_4N(CH_3)_2$ with $NH_2$ | $N(C_4H_9)_2$ | $N(C_4H_9)_2$ | CN | $C_7H_7SO_3$ | yellow |
| 3-pyridyl | $NH_2$ | $NH_2$ | $NHC_6H_4CH_2N(CH)_3)_3(p)$ | CN | Br | orange |
| quinolinyl-8 | $NHC_2H_4N(CH_3)_3$ | $SCH_3$ | $NH_2$ | CN | Cl | yellow |
| 5-phenyl-1,2,4-tria-zolyl-3 | $NH_2$ | $NH_2$ | $NHC_2H_4N(C_2H_5)_2$ with $CH(CH_3)_2$ | CN | Cl | |

EXAMPLE 3

2.76 parts of 4-nitroaniline are made into a paste with 8 parts by volume of concentrated hydrochloric acid and stirred into a mixture of 80 parts of ice and water. The suspension is diazotised with 5 parts by volume of 4N sodium nitrite solution at 0° C to 5° C. The diazo solution is added to a solution of 4.68 parts of 2-dimethylaminopropylamino-3-cyano-4,6-diaminopyridine in 20 parts of alcohol. Upon completion of the coupling the mixture is adjusted to a pH of 8.9 with sodium hydroxide solution. The precipitated dye is filtered off, washed with water and dried. It dyes polyacrylonitrile fibres in reddish yellow shades of excellent fastness properties. Further dyes of the formula

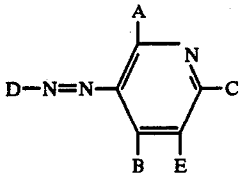

wherein the symbols D, A, B, C, and E have the meanings given in the following Table, are obtained in analogous manner.

Table 2
| D | A | B | C | E | Shade |
|---|---|---|---|---|---|
| 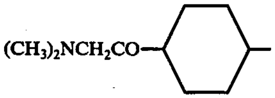 | $NH_2$ | $NH_2$ | Pyrrolidino | CN | golden yellow |
| 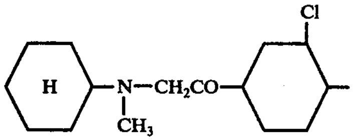 | $NH_2$ | $NH_2$ | $NHC_4H_9$ | CN | golden yellow |
| 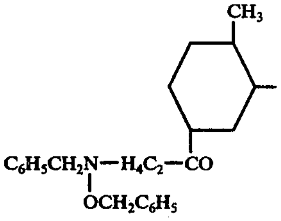 | $NH_2$ | $NH_2$ | $OCH(CH_3)_2$ | CN | yellow |
| 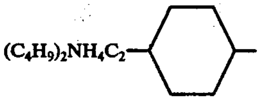 | $NH_2$ | $NH_2$ | $NHC_6H_4OCH_3$(m) | CN | yellow |
| 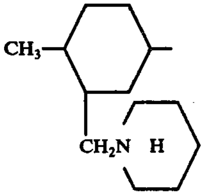 | $NH_2$ | $NH_2$ | $SC_6H_3Cl_2$(2,5) | CN | yellow |
| 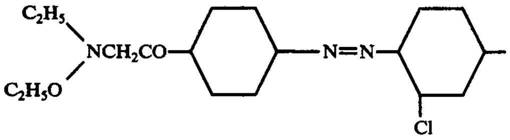 | $OC_6H_5$ | $N(C_2H_5)_2$ | $N(C_2H_5)_2$ | CN | yellow |
| 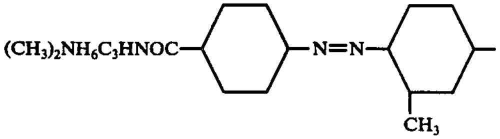 | $NH_2$ | $NH_2$ | $NHCH_2C_6H_5$ | CN | orange |

Table 2-continued
| D | A | B | C | E | Shade |
|---|---|---|---|---|---|
| 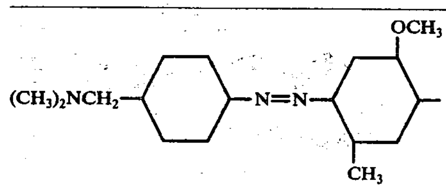 | $NH_2$ | $NH_2$ | $NHC_3H_6OCH_3$ | CN | orange |
| 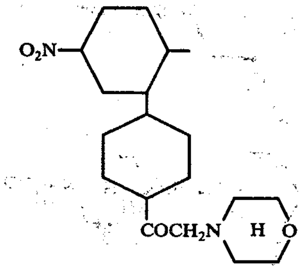 | $NHC_6H_5$ | $NHC_2H_5$ | $NHC_2H_5$ | CN | orange |
| 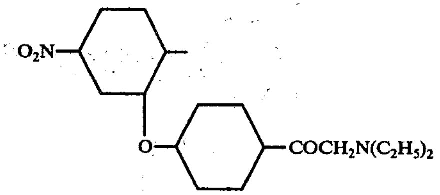 | $NH_2$ | $NH_2$ | 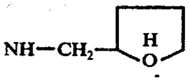 | CN | orange |
| 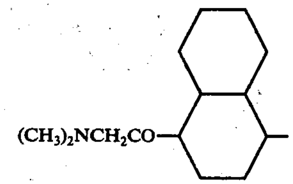 | $SC_6H_5$ | $NHCH_3$ | $NHCH_3$ | CN | orange |
| 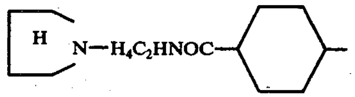 | $NH_2$ | $NH_2$ | $OC_6H_3(CH_3)_2(3,4)$ | CN | yellow |
| 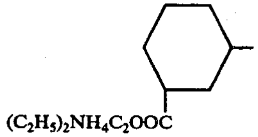 | $NH_2$ | $NH_2$ | $SC_6H_{13}$ | CN | yellow |

Table 2-continued
| D | A | B | C | E | Shade |
|---|---|---|---|---|---|
| 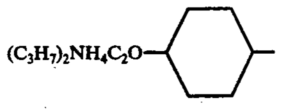 | NH-cyclohexyl | $NHCH(CH_3)_2$ | $NHCH(CH_3)_2$ | CN | reddish yellow |
| 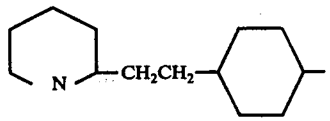 | $NH_2$ | $NH_2$ | $NHC_4H_8OH$ | CN | yellow |
| 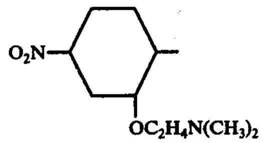 | $NH_2$ | $NH_2$ | $N(C_2H_4OCOCH_3)_2$ | CN | orange |
| 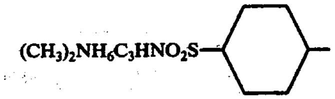 | $NH_2$ | $NHC_6H_5$ | $NHC_6H_5$ | CN | orange |
| 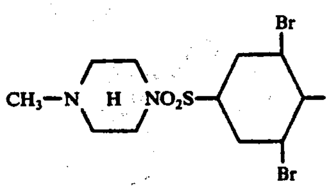 | $NHC_6H_{13}$ | $N(CH_3)_2$ | $N(CH_3)_2$ | CN | orange |
| 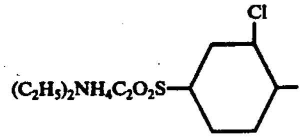 | $NH_2$ | $NH_2$ | $OC_2H_4C_6H_5$ | CN | yellow |
| 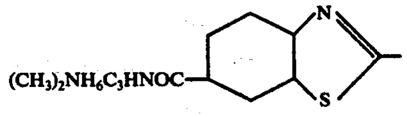 | $NH_2$ | $NH_2$ | Thiomorpholino | CN | orange |
| 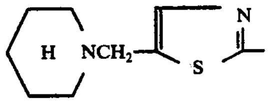 | $NHCH_3$ | $N(CH_3)_2$ | $N(CH_3)_2$ | CN | orange |

Table 2-continued

| D | A | B | C | E | Shade |
|---|---|---|---|---|---|
| 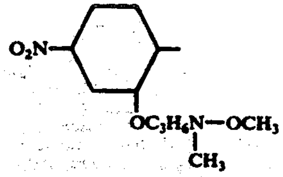 | $NHC_2H_5$ | $SCH_3$ | $NH_2$ | CN | yellow |
|  | $OC_3H_7$ | $NHCH(CH_3)_2$ | $NHCH(CH_3)_2$ | CN | yellow |
| 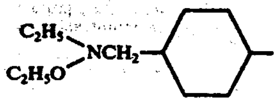 | $NH_2$ | $NH_2$ | $NHC_6H_{13}$ | $CONH_2$ | yellow |
| 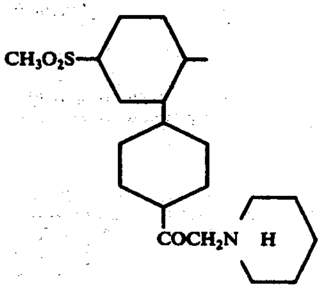 | $NHC_4H_9$ | $N(CH_3)_2$ | $N(CH_3)_2$ | $CONH_2$ | orange |
| 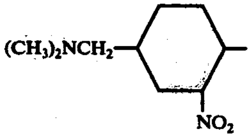 | $N(CH_3)_2$ | $NHC_2H_5$ | $NHC_2H_5$ | $CONH_2$ | yellow |
| 2-bromo-4-nitrophenyl | $NH_2$ | $NH_2$ | $NHC_3H_6N(CH_3)_2$ | CN | orange |
| 4-phenylazophenyl | $NH_2$ | $NH_2$ | $NHC_2H_4N(C_2H_5)_2$ | CN | orange |
| 4-chloro-2-cyanophenyl | $NH_2$ | $NH_2$ | $NHC_6H_{12}NH_2$ | CN | reddish yellow |
| 6-nitrobenzthiazolyl-2 | $NH_2$ | $NH_2$ | 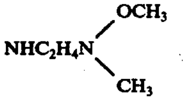 | CN | violet |
| 4-ethoxycarbonylphenyl | $NH_2$ | $NH_2$ | 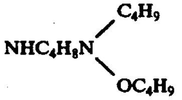 | CN | golden yellow |

Table 2-continued

| D | A | B | C | E | Shade |
|---|---|---|---|---|---|
| 2-methyl-4-nitrophenyl | $NH_2$ | $NH_2$ |  | CN | orange |
| 4-[4'-nitrophenyl-]azophenyl | $NH_2$ | $NH_2$ | 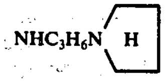 | CN | orange |
| 2,6-dichloro-4-ethylsulphonylphenyl | $NH_2$ | $NH_2$ |  | CN | orange |
| 3-phenyl-1,2,4-thiadiazolyl | $NH_2$ | $NH_2$ | 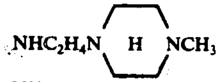 | CN | golden yellow |
| 4-diphenyl | $NH_2$ | $NH_2$ | $NHC_6H_4CH_2N(CH_3)_2$(m) | CN | golden |
| 5-chloroindazolyl-3 | $NH_2$ | $NH_2$ | $NHC_6H_4OC_2H_4N(C_2H_5)_2$(p) | CN | orange |
| 5-acetyl-3-nitrothiophenyl-2 | $NHC_2H_4N(CH_3)_2$ | $N(CH_3)_2$ | $N(CH_3)_2$ | CN | deep purplish red |
| 5-methylsulphonylthiazolyl-2 | 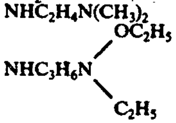 | $NHCH(CH_3)_2$ | $NHCH(CH_3)_2$ | CN | red |
| 3-phenoxysulphonylphenyl | 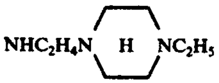 | $NHC_2H_5$ | $NHC_2H_5$ | CN | yellow |
| quinolinyl-8 |  | $NHCH_3$ | $NHCH_3$ | CN | orange |
| 4-butylaminocarbonyl | $NH_2$ | $NHC_2H_4N(C_2H_5)_2$ | $NHC_2H_4N(C_2H_5)_2$ | CN | golden yellow |
| 2-ethyl-5-nitrophenyl | $NH_2$ | $NHC_3H_6N(CH_3)_2$ | $NHC_6H_5$ | CN | yellow |
| 2-chloro-4-nitrophenyl | $NH_2$ | $NH_2$ | $OC_2H_4N(CH_3)_2$ | CN | yellow |
| 2-ethoxycarbonyl-4-nitrophenyl | $NH_2$ | $NH_2$ | $SC_2H_4N(C_2H_5)_2$ | CN | yellow |
| 3-methyl-4-nitro-1,2-isothiazolyl-5 | $OC_2H_4N(CH_3)_2$ | piperidino | piperidino | CN | red |
| 5-chlorobenzo-2,1-isothiazolyl-3 | $SC_4H_8N(C_2H_5)_2$ | $NHCH(CH_3)_2$ | $NHCH(CH_3)_2$ | CN | scarlet |
| 2-cyano-4-nitrophenyl | $NHC_2H_4N(CH_3)_2$ | $SCH_3$ | $NH_2$ | CN | orange |
| 2,4,6-trichlorophenyl | $NHC_3H_7$ | $SC_2H_4N(C_2H_5)_2$ | $NH_2$ | CN | yellow |
| 2-methylsulphonyl-4-nitrophenyl | $NH_2$ | $NHC_2H_4N(CH_3)_2$ | $NHC_2H_4C_6H_5$ | $CONH_2$ | scarlet |
| 2,4-dinitrophenyl | $NH_2$ | $NH_2$ | $NHC_2H_4N(C_2H_5)_2$ | $CONH_2$ | red |
| 4-nitro-1-naphthyl | $NHC_2H_4NH_2$ | $NHC_2H_5$ | $NHC_2H_5$ | $CONH_2$ | red |
| 2-naphthyl | $NHC_6H_{12}NH_2$ | $NHCH_3$ | $NHCH_3$ | $CONH_2$ | orange |
| 4-w-dimethylaminoacetylphenyl | $NH_2$ | $NH_2$ | $NHC_3H_6N(CH_3)_2$ | CN | golden yellow |

EXAMPLE 4

3.83 parts of the dye described in Example 3 are dissolved hot in 150 parts of chlorobenezene. A solution of 1.9 parts of dimethyl sulphate in 10 parts of chlorobenzene is added dropwise and the reaction mixture is further stirred for 3 hours at 95°–100° C. After it has cooled the suspension is filtered off. The filter residue is dissolved in hot water, the solution is filtered and the product is salted out from the filtrate with sodium and zinc chloride. The prcepitated dyes of the formula

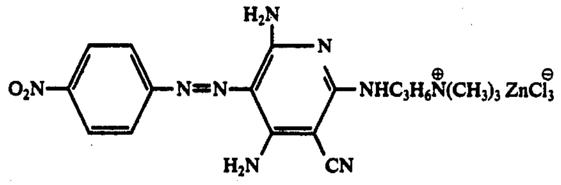

is filtered off and dried. It dyes polyacrylonitrile fibres in reddish yellow shades of excellent fastness properties.

In analogous manner further dyes are obtained by alkylating of the dyes designated hereinbelow of the formula

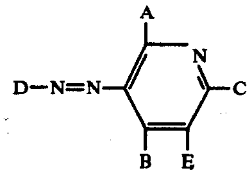

with the alkylating agents listed in the second last column of the Table.

Table 3

| D | A | B | C | E | Alkylating Agent | Shade |
|---|---|---|---|---|---|---|
| 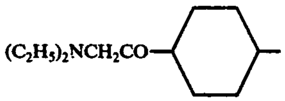 | $NH_2$ | $NH_2$ | $NHCH_3$ | CN | $C_6H_5CH_2Cl$ | golden yellow |
| 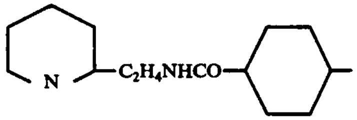 | $NH_2$ | $NH_2$ | $NHC_6H_5$ | CN | $C_7H_7SO_3CH_3$ | golden yellow |
|  | $NH_2$ | $NH_2$ | $NHCH_2C_6H_5$ | CN | $C_4H_9Br$ | golden yellow |
| 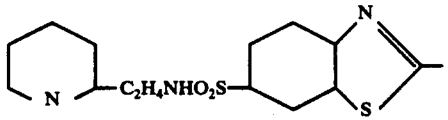 | $NHCH_2$— 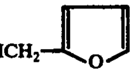 | $NHC_2H_5$ | $NHC_2H_5$ | CN | $C_2H_5I$ | reddish orange |
| 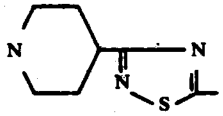 | $NH_2$ | $NH_2$ | $N(CH_3)_2$ | CN | $(CH_3)_2SO_4$ | golden yellow |
| 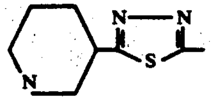 | $NHC_4H_9$ | $SCH_3$ | $NH_2$ | CN | $C_6H_5SO_3CH_3$ | yellow |
| 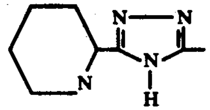 | $NH_2$ | $NH_2$ | $OC_6H_{13}$ | CN | $(CH_3)_2CHBr$ | yellow |
| 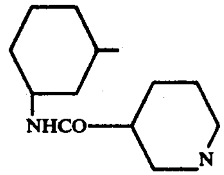 | $NHC_6H_{13}$ | $NHCH_3$ | $NHCH_3$ | $CONH_2$ | $ClC_2H_4OH$ | yellow |
| 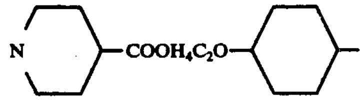 | $SC_2H_4OH$ | $NHCH(C_2H_5)(CH_3)$ | $NHCH(C_2H_5)(CH_3)$ | CN | $ClCH_2CONH_2$ | yellow |

Table 3-continued

| D | A | B | C | E | Alkylating Agent | Shade |
|---|---|---|---|---|---|---|
| 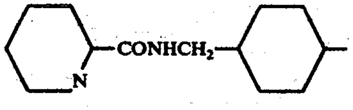 | $NH_2$ | $NH_2$ | $OC_6H_4OCH_3$(p) | CN | $(C_2H_5)_2SO_4$ | yellow |
| 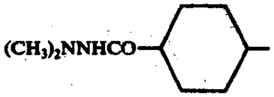 | $NH_2$ | $NH_2$ | piperidino | CN | $(CH_3)_2SO_4$ | yellow |
| 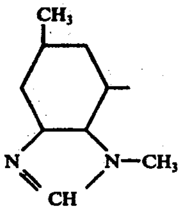 | $NH_2$ | $NH_2$ | $NHC_6H_{13}$ | CN | $(CH_3)_2SO_4$ | yellow |
| 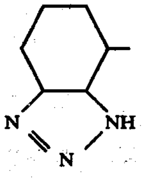 | $N(CH_3)_2$ | $N(CH_3)_2$ | $N(CH_3)_2$ | CN | $(CH_3)_2SO_4$ | yellow |
| 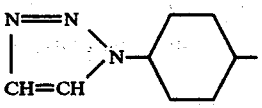 | $NH_2$ | $NH_2$ | $OC_6H_5$ | CN | $(CH_3)_2SO_4$ | yellow |
| 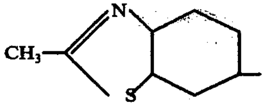 | $N(CH_3)_2$ | $NHC_2H_5$ | $NHC_2H_5$ | $CONH_2$ | $C_7H_7SO_3CH_3$ | yellow |
| 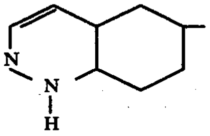 | $OC_2H_4C_6H_5$ | $NHCH(CH_3)_2$ | $NHCH(CH_3)_2$ | CN | $(C_2H_5)_2SO_4$ | yellow |
| 2,6-dichloro-4-nitro-phenyl | $NH_2$ | $NH_2$ | 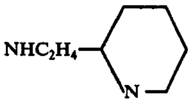 | CN | $(CH_3)_2SO_4$ | orange |

Table 3-continued

| D | A | B | C | E | Alkylating Agent | Shade |
|---|---|---|---|---|---|---|
| 4-phenylazo-2-nitro-phenyl | $NHC_2H_4$ 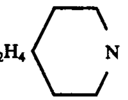 | $NHC_2H_5$ | $NHC_2H_5$ | CN | $(C_2H_5)_2SO_4$ | red |
| 2,5-dichloro-4-dimethylaminosulphonyl-phenyl | $NH_2$ | $NH_2$ | $NHC_2H_4N(CH_3)-C_6H_4OCH_3(p)$ | CN | $C_7H_7SO_3CH_3$ | orange |
| 5-chloro-2-phenoxy-phenyl | $NHC_2H_4OCO$ 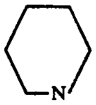 | $N(CH_3)_2$ | $N(CH_3)_2$ | CN | $C_7H_7SO_3C_2H_5$ | yellow |
| 4-chloro-2-trifluoro-methylphenyl | $NH_2$ | $NH_2$ | $NHC_6H_4N(CH_3)_2$ | $CONH_2$ | $(CH_3)_2SO_4$ | yellow |
| $(CH_3)_2NNHCO-$ 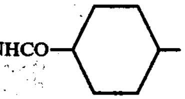 | $NH_2$ | $NH_2$ | $NHC_2H_4-$ 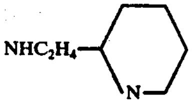 | $CONH_2$ | $(CH_3)_2SO_4$ | yellow |

Dyes with similarly good properties are obtained by quaternising dyes listed in Table 2 with one of the following quaternising agents: dimethyl sulphate, diethyl sulphate, ethyl iodide, butyl bromide, benzyl chloride, 2-chloroethanol, 2-chloropropionic ethyl ester, 2-bromopropionic amide, p-toluenesulphonic acid methyl ester and benzenesulphonic acid ethyl ester.

EXAMPLE 5

1.5 parts of sodium nitrite are sprinkled at 0.10° C into 18 parts of concentrated sulphuric acid. The mixture is heated to 65° C until all is dissolved, and the solution is then cooled to 0° C and treated dropwise with 20 parts by volume of a mixture of glacial acetic acid and propionic acid in the ratio 4:1. To the resulting solution is added dropwise a solution of 2 parts of 2-aminothiazole in 20 parts by volume of a mixture of glacial acetic acid and propionic acid (4:1) and the reaction mixture is further stirred for 3 hours at 0°-5° C. Then 1.5 parts of urea are added in small amounts of a time to this diazo solution. The resulting diazo solution is added to a solution of 3.54 parts of 2-ethylamino-3-cyano-4,6-diaminopyridine in 20 parts of alcohol. The mixture is further stirred for 10 hours and the pH is adjusted to 8 with sodium hydroxide solution. The precipitated dye is filtered off, washed with water and dried.

2.88 parts of the above obtained dye are dissolved hot in 150 parts of nitrobenzene. A solution of 1.9 parts of dimethyl in 10 parts of nitrobenzene are added dropwise and the reaction mixture is further stirred for 3 hours at 95°-100° C. After it has cooled the suspension is filtered off. The filter residue is dissolved in hot water and when the solution has been filtered, the product is salted out from the filtrate with sodium and zinc chloride.

The precipiated dye of the formula

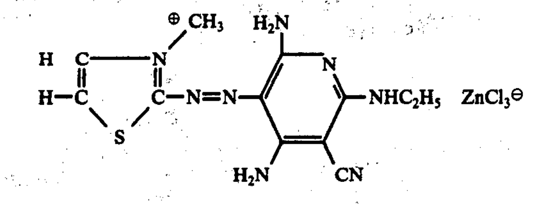

is filtered off and dried. It dyes polyacrylonitrile fibres in brilliant orange shades of excellent fastness properties. Further quaternised dyes are obtained by alkylation of the dyes listed hereinbelow of the formula

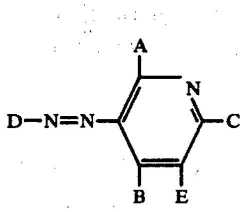

with the alkylating agents listed in the second last column of the Table.

Table 4

| D | A | B | C | E | Alkylating Agent | Shade |
|---|---|---|---|---|---|---|
| benzthiazole-2 | $NH_2$ | $NH_2$ | $NHCH_3$ | CN | $(C_2H_5)_2SO_4$ | scarlet |
| 1,3,4-thiadiazolyl-2 | $NH_2$ | $NH_2$ | $NHC_2H_4C_6H_5$ | CN | $C_7H_7SO_3CH_3$ | orange |
| 1,2,4-thiadiazolyl-5 | $NH_2$ | $NH_2$ | $OC_6H_5$ | CN | $C_6H_5SO_3CH_3$ | yellow |
| pyridine-3 | $NH_2$ | $NH_2$ | $SCH_3$ | CN | $C_4H_9Br$ | yellow |
| 4-(6'-methyl-2'-benzthiazolyl)phenyl | $NH_2$ | $NH_2$ | $NHC_2H_4OH$ | CN | $BrCH_2CONH_2$ | orange |
| 3-methyl-1,2-isothiazolyl-5 | $NH_2$ | $NH_2$ | $NHC_4H_9$ | CN | $(CH_3)_2SO_4$ | orange |
| 3-methyl-1-phenylpyrazolyl-5 | $NHC_3H_7$ | $SCH_3$ | $NH_2$ | CN | $(C_2H_5)_2SO_4$ | yellow |
| 1,2,4-triazolyl-3 | $NH_2$ | $NH_2$ | NHcyclohexyl | CN | $(CH_3)_2SO_4$ | yellow |
| 1-methylimidazolyl-5 | $NH_2$ | $NH_2$ | $NHC_3H_6OC_2H_5$ | $CONH_2$ | $CH_3J$ | yellow |
| indazolyl-3 | $SC_2H_5$ | $NHC_2H_5$ | $NHC_2H_5$ | CN | $C_7H_7SO_3CH_3$ | orange |
| benz-2,1-isothiazolyl-3 | $NH_2$ | $NH_2$ | piperidino | CN | $(CH_3)_2SO_4$ | red |
| thiazolyl-2 | $NH_2$ | $NH_2$ | $N(CH_3)_2$ | CN | $(CH_3)_2SO_4$ | orange |
| 6-methoxybenzthiazolyl-2 | $NH_2$ | $NH_2$ | $OCH_3$ | CN | $C_6H_5SO_3C_2H_5$ | orange |
| 5-methyl-1,3,4-thiazolyl-2 | $NH_2$ | $NH_2$ | $SC_6H_5$ | CN | $(C_2H_5)_2SO_4$ | yellow |
| 3-methyl-1,2,4-thiazolyl-5 | $OC_2H_5$ | $NHCH(CH_3)_2$ | $NHCH(CH_3)_2$ | CN | $C_7H_7SO_3CH_3$ | yellow |
| 2-methoxypyridyl-4 | $NH_2$ | $NH_2$ | $N(C_2H_5)_2$ | CN | $(CH_3)_2SO_4$ | scarlet |
| 5-methyl-1,2-isoxazolyl-3 | $N(CH_3)_2$ | $N(CH_3)_2$ | $N(CH_3)_2$ | $CONH_2$ | $C_6H_5CH_2Cl$ | yellow |
| 1-phenylpyrazolyl-5 | $NH_2$ | $NH_2$ | $NHC_6H_5$ | CN | $ClC_2H_4OH$ | yellow |
| 5-imino-1,2,4-triazolyl-3 | $OC_6H_5$ | $N(C_2H_5)_2$ | $N(C_2H_5)_2$ | CN | $(CH_3)_2SO_4$ | yellow |
| 4-methylthiazolyl-2 | $NH_2$ | $NH_2$ | $NHC_6H_5$ | $CONH_2$ | $ClCH_2CH_2COOC_2H_5$ | orange |
| 3-methoxy-1,2,4-thiadiazolyl-5 | $OC_2H_4OH$ | $NHCH_3$ | $NHCH_3$ | CN | $C_6H_5CH_2Cl$ | yellow |
| 2-methylchinolinyl-4 | $NHC_6H_4CH_3(p)$ | $NHCH(CH_3)_2$ | $NHCH(CH_3)_2$ | CN | $(CH_3)_2SO_4$ | scarlet |
| 3-methylpyrazolyl-5 | $NH_2$ | $NH_2$ | $NHC_6H_{13}$ | CN | $(CH_3)_2SO_4$ | yellow |
| 5-methylthio-1,2,4-triazolyl-3 | $NH_2$ | $NH_2$ | $N(C_4H_9)_2$ | $CONH_2$ | $C_7H_7SO_3CH_3$ | yellow |
| 5-methylthiothiazolyl-2 | $NHCH_3$ | $SC_2H_5$ | $NH_2$ | CN | $(CH_3)_2SO_4$ | yellow |
| 3-methylthio-1,2,4-thiadiazolyl-5 | $NH_2$ | $NH_2$ | $OC_6H_{13}$ | CN | $(C_2H_5)_2SO_4$ | yellow |

EXAMPLE 6

18.5 parts of 5-[4'-chloroacetylphenyl]-azo-2-butylamino-4,6-diamino-3-cyanopyridine, 33 parts of 40% aqueous trimethylamine solution and 20 parts of water are stirred for 20 hours at 20° C to 25° C and the mixture is subsequently heated for 5 hours at 60° C to 65° C. The mixture is then cooled, 500 parts of water and dilute hydrochloric acid are added until the onset of a weakly acid reaction. The mixture is heated, filtered hot and the filtrate salted out with sodium chloride. The precipitated dye of the formula

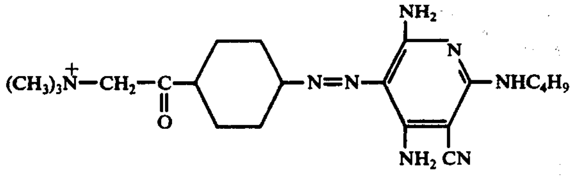

dyes polyacrylonitrile fibres in reddish yellow shades of very good fastness properties.

Further dyes are obtained in accordance with the above process by condensing a dye of the formula

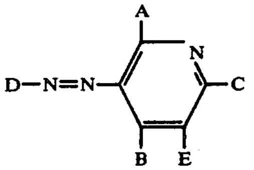

wherein the symbols D, A, B, C and E have the meanings given in the following Table, with the compounds listed in the second last column.

Table 5

| D | A | B | C | E | Alkylating Agent | Shade |
|---|---|---|---|---|---|---|
| 2-chloro-4-nitrophenyl | $NH_2$ | $NH_2$ | $NHC_2H_4NH_2$ | CN | $(CH_3)_3\overset{+}{N}CH_2COCl$ $Cl^-$ | orange |
| 4-nitrophenyl | $NHC_2H_4Cl$ | $N(CH_3)_2$ | $N(CH_3)_2$ | $CONH_2$ | $N(CH_3)_2$ $OCH_3$ | orange |
| chloroethylaminosulphonylphenyl | $NHCH_3$ | $SCH_3$ | $NH_2$ | CN | Pyridin | yellow |
| 2,4,5-trichlorophenyl | $NHC_2H_4Cl$ | $N(C_2H_5)_2$ | $N(C_2H_5)_2$ | CN | $H_2NN(CH_3)_2$ | yellow |

EXAMPLE 7

3.6 parts of 3-methylbenthiazolone-2-hydrazone are dissolved in 40 parts of glacial acetic acid, and 4.3 parts of 4,6-diamino-3-cycno-2-piperidinopyridine and 0.5 parts of concentrated hydrochloric acid are added. A solution of 26.9 parts of iron-III-chloride hexahydrate in 35 parts of water are slowly added dropwise at 15°-20° C and the reaction mixture is further stirred for 3 hours. The precipitated product is filtered off and washed with a small amount of sodium chloride solution. The filter cake is dissolved in hot water, filtered clear and the product salted out from the filtrate with sodium chloride, The precipitated dye of the formula

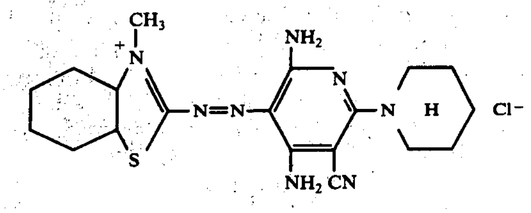

is filtered off and dried. It dyes polyacrylonitrile fibers in crimson lake shades of very good fastness properties.

Dyes with similarly good properties are obtained by using instead of benzthiazolone-hydrazone a corresponding amount of 3-methylthiazilone-2-hydrazone
4-methyl-1,2,4-thiadiazole-5-hydrazone
3-methyl-1,3,4-thiadiazolone-2-hydrazone
1-methylquinolinone-2-hydrazone
2-methylpyridazone-3-hydrazone or
1,2-dimethyl-3-indazolone-hydrazone.

EXAMPLE 8

4.57 g of 4-aminophenacyltrimethylammonium chloride, obtained by reacting 4-aminophenacyl chloride with trimethylamine, are dissolved in 20 ml of water, 8 parts by volume of concentrated hydrochloric acid are added to the solution and it is diazotised at 0° to 5° C by the addition of 5 parts by volume of 4 N sodium nitrite solution. The diazo solution is then added at 0° to 5° C to a solution of 4.9 g of 3-cyano-6-imino-1-methyl-4-methylamino-2-piperidino-1,2-dihydropyridine in 30 ml of ethanol, the coupling mixture is rendered neutral to Congo Red by adding sodium acetate solution, and, after the completion of the coupling, the dyestuff formed is precipitated with 10% strength sodium chloride solution. The dyestuff is filtered off and dissolved in hot water and, after filtering the solution, is salted out from the filtrate with sodium chloride. The precipitated dyestuff of the formula

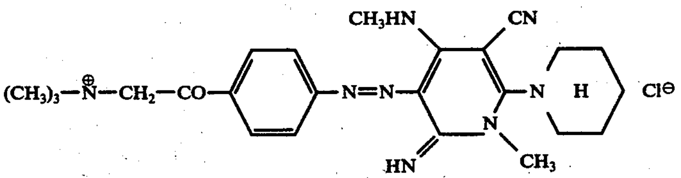

is filtered off and dried. It dyes polyacrylonitrile fibres in orange colour shades of excellent fastness.

EXAMPLE 9

3.54 parts of 5-amino-3-phenyl-1,2,4-thiadiazole are dissolved in 20 parts by volume of formic acid. 1.4 parts of sodium nitrite are introduced at 0° to 5° C and the mixture is stirred for 30 minutes. 0.05 part of sulphamic acid is then added. 7.8 parts of 3(3'-cyano 1'-methyl-4'-methylamino-6'-imino-1',6'-dihydropyridine-2'-)amino-propyl-1-trimethylammonium methosulphate are then introduced and are rinsed in with 10 parts by volume of formic acid. The mixture is slowly heated to 60° C and is stirred at this temperature for 2 hours. The paste is diluted with water, dissolved by heating and, after filtering the solution, is salted out from the filtrate with sodium chloride and zinc chloride.

The precipitated dyestuff of the formula

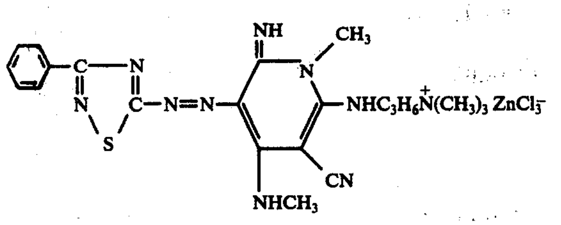

is filtered off and dried. It dyes polyacrylonitrile fibres in orange colour shades of very good fastness.

The coupling component is obtained by alkylating the intermediate product described in Instruction 15 with dimethyl sulphate in chlorobenzene solution.

Further dyestuffs of the formula

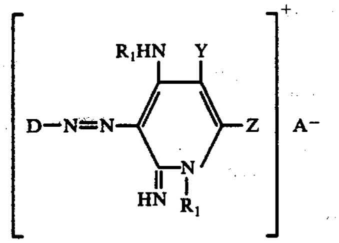

wherein the symbols A, D, $R_1$, Y and Z have the meaning indicated in the following table, are obtained in an analogous manner.

Table 6

| D | R'₁ | Z | Y | A | Colour shade |
|---|---|---|---|---|---|
| 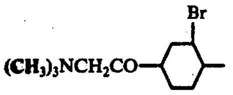 | $-CH-C_2H_5$<br>$CH_3$ | —NH-Cyclopentyl | CN | Br | Golden yellow |
|  | $-CH_3$ | $-NHC_6H_5$ | CN | Cl | Golden yellow |
| 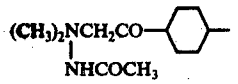 | $-CH_3$ | $-OC_6H_5$ | CN | Cl | yellow |
| 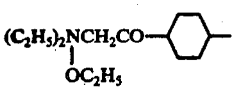 | —Cyclohexyl | Morpholino | CN | Cl | Golden yellow |
| 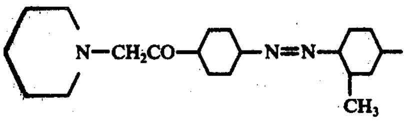 | $-CH_3$ | $-NHC_3H_6OCH(CH_3)_2$ | CN | Cl | Orange |
| 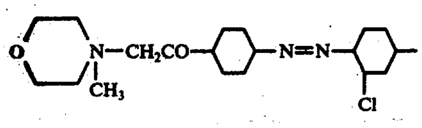 | $-CH_3$ | $-NHC_6H_4OCH_3$(p) | CN | $CH_3COO$ | Orange |
| 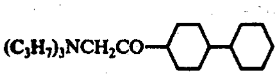 | $-CH_3$ | $-N(C_2H_4OH)_2$ | $CONH_2$ | Cl | Orange |
| 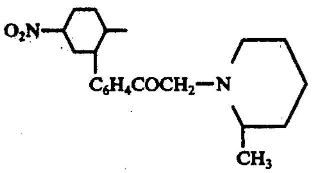 | $-CH(CH_3)_2$ | 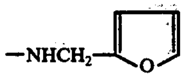 | CN | Cl | Orange |
| 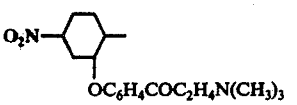 | $-C_3H_6OCH_3$ | $-NHCHC_2H_5$<br>$CH_3$ | CN | Br | Orange |
| 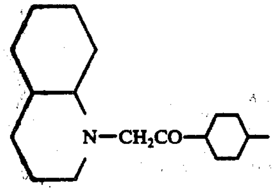 | $-C_4H_9$ | $-NHC_6H_4OCH_3$(O) | $CONH_2$ | Cl | Orange |

Table 6-continued

| D | $R_1'$ | Z | Y | A | Colour shade |
|---|---|---|---|---|---|
| 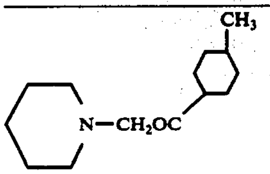 | $-C_2H_4C_6H_5$ | $-NHC_4H_8OH$ | CN | Br | Yellow |
|  | $-CH_3$ | $-NHCH(CH_3)_2$ | CN | I | Golden yellow |
| 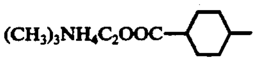 | -Cyclopentyl | $-NHC_3H_6OCH_3$ | CN | $CH_3SO_4$ | Golden yellow |
| 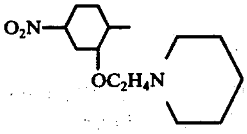 | $-C_3H_6OCH(CH_3)_2$ | $-NHC_4H_9$ | CN | $CH_3SO_4$ | Red-orange |
| 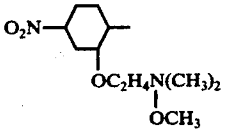 | $-C_3H_6OC_2H_5$ | $-NHC_2H_4C_6H_5$ | CN | $C_7H_7SO_3$ | Red-orange |
| 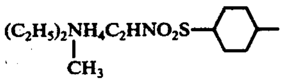 | $-CH_2C_6H_5$ | Morpholino | CN | $C_6H_5SO_3$ | Orange |
| 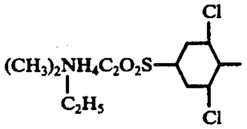 | $-C_2H_5$ | $-SC_6H_5$ | CN | ⅓ $PO_4$ | Golden yellow |
| 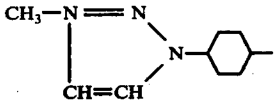 | $-C_3H_6OCH_3$ | $-N(CH_3)_2$ | CN | $CH_3SO_4$ | Orange |
| 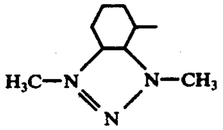 | $-C_2H_5$ | Pyrrolidino | CN | $CH_3SO_4$ | Orange |
| 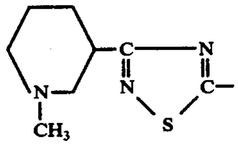 | $-CH_3$ | $-NHC_6H_4Br$ | CN | ½ $SO_4$ | Orange |
| 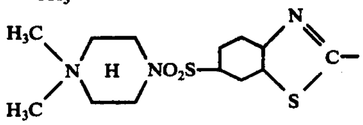 | $-CH_2CH(CH_3)_2$ | $-NHC_2H_4OC_6H_5$ | CN | $C_6H_5SO_3$ | Scarlet |
| 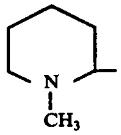 | $-CH_3$ | $-NHC_6H_{13}$ | CN | ½ $SO_4$ | Orange |
| 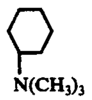 | $-CH_3$ | $-NHCH_3$ | CN | Cl | Yellow |
| 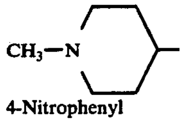 | $-C_3H_7$ | $-N(C_4H_9)_2$ | CN | $ZnCl_3$ | Orange |
| 4-Nitrophenyl | $-CH_3$ | $-NHC_3H_6N(CH_3)_2$ with $CH_2C_6H_5$ | CN | Cl | Orange |
| 5-Nitrothiazolyl-2 | $-C_3H_6OCH_3$ | $-NHC_3H_6N(CH_3)_3$ | CN | $CH_3SO_4$ | Red- |

Table 6-continued

| D | $R_1'$ | Z | Y | A | Colour shade |
|---|---|---|---|---|---|
| | | | | | violet |
| 4-Nitro-2-trifluoromethylphenyl | $-CH_3$ | 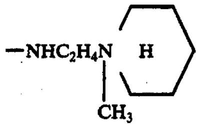 | CN | $C_6H_5SO_3$ | Scarlet |
| 4-(4'-Nitrophenyl)-azophenyl | $-CHC_2H_5$<br>$CH_3$ | 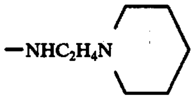 | CN | Br | Orange |
| 2-Chloro-4-nitrophenyl | $-CH_3$ | $-NHC_3H_6N(CH_3)_2$<br>$C_2H_5$ | CN | $C_2H_5SO_4$ | Scarlet |
| 2,5-Dichloro-4-dimethylamino-sulphonylphenyl | $-C_2H_5$ | 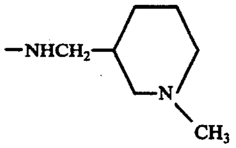 | CN | $C_7H_7SO_3$ | Orange |
| 4-Phenylazophenyl | $-C_2H_4C_6H_5$ | $-NHC_3H_6N(CH_3)_3$ | $CONH_2$ | Cl | Scarlet |
| 5-Nitro-7-bromo-2,1-benziso-thiazolyl-3 | $-C_3H_6OC_2H_5$ | 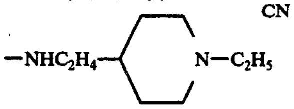 | CN | $C_2H_5SO_4$ | Blue |
| 2,6-Dichloro-4-nitrophenyl | $-C_3H_6OC_2H_5$ | $-NHC_3H_6N(CH_3)_3$ | CN | Cl | Scarlet |
| 5-Acetyl-3-nitrothiophenyl-2 | —Cyclohexyl | 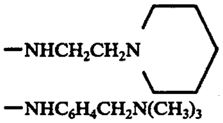 | CN | Br | Ruby |
| 3-Methylthio-1,2,4-thiadi-azolyl-2 | $-CH_3$ | $-NHC_6H_4CH_2N(CH_3)_3$ | CN | $CH_3SO_4$ | Orange |
| 6-Methylsulphonylbenzthi-azolyl-2 | $-C_2H_5$ | 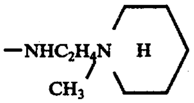 | CN | $CH_3SO_4$ | Scarlet |
| 2-Ethoxycarbonyl-4-nitrophenyl | $-C_4H_9$ | $-NHC_2H_4OC_2H_4N(CH_3)_2$<br>$C_2H_4COOC_2H_5$ | CN | Br | Scarlet |
| 6-Chloro-2,4-dinitrophenyl | $-C_2H_4C_6H_5$ | 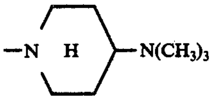 | CN | $C_7H_7SO_3$ | Red |
| 6-Bromo-2-cyano-4-nitrophenyl | $-C_2H_4C_6H_5$ | 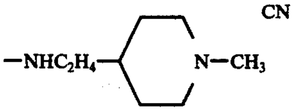 | CN | Cl | Ruby |
| 1-Methyl-4-nitroimidazolyl-5 | $-C_6H_{13}$ | 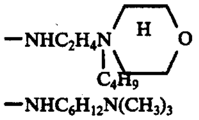 | CN | Br | Scarlet |
| 2-Cyano-4,6-dinitrophenyl | $-CH_3$ | $-NHC_6H_{12}N(CH_3)_3$ | CN | 1/2 $SO_4$ | Ruby |
| 2-Methoxy-5-nitrophenyl | —Cyclohexyl | 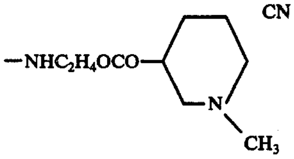 | CN | 1/3 $PO_4$ | Yellow |
| 2,6-Dichloro-4-aminosulphonyl-phenyl | $-C_3H_7$ | $-NHC_3H_6N(CH_3)_2$<br>$C_2H_4C_6H_5$ | CN | Br | Orange |
| 4-Azophenyl-2-nitrophenyl | —Cyclohexyl | $-NHC_2H_4OCOCH_2N(CH_3)_3$ | CN | $HSO_4$ | Red |
| 2,4-Dicyanophenyl | —Cyclopentyl | 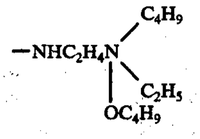 | CN | I | Orange |

Table 6-continued

| D | $R'_1$ | Z | Y | A | Colour shade |
|---|---|---|---|---|---|
| 1-Phenyl-3-methylpyrazololyl-5 | $-CH_3$ | 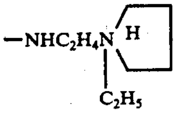 | CN | $CH_3COO$ | Yellow |
| 5,6-Dichlorobenzthiazolyl-2 | $-C_3H_6OCH(CH_3)_2$ | $-NHC_3H_6N(CH_3)_2$<br>$CH_2C_6H_5$ | CN | Cl | Scarlet |
| 3-Methyl-4-nitro-1,2-isothiazolyl-5 | $-C_3H_7$ | 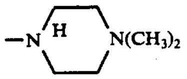 | CN | $C_7H_7SO_3$ | Ruby |
| 2-Methyl-4-nitrophenyl | $-C_5H_{11}$ | $-NHC_6H_4C_2H_4N(CH_3)_3(p)$ | $CONH_2$ | Cl | Scarlet |
| 4-Dimethylaminocarbonylphenyl | $-C_2H_4C_6H_5$ | $-NHC_3H_6N(CH_3)_2$<br>$C_2H_5$ | CN | $C_2H_5SO_4$ | Golden yellow |
| 2,4-Dinitrophenyl | $-CH_3$ | $-NHC_2H_4N(C_2H_5)_3$ | CN | $C_2H_5SO_4$ | Red |
| 4-Methoxy-2-nitrophenyl | $-C_2H_5$ | $-NHC_6H_{12}N(CH_3)_3$ | CN | Cl | Orange |
| 4-Ethylaminosulphonylphenyl | $-C_2H_5$ | $-NHC_3H_6N(CH_3)_2$<br>$CH_2C_6H_5$ | CN | Cl | Orange |
| 5-Phenyl-1,3,4-thiadiazolyl-2 | —Cyclopentyl | $-NHC_2H_4N(CH_3)_2$<br>$NH_2$ | CN | $CH_3SO_3$ | Red-Yellow |
| 2-Methyl-5-nitrophenyl | $-CH(CH_3)_2$ | $-NHC_6H_4CH_2N(CH_3)_3(p)$ | CN | Cl | Yellow |
| 2-Ethoxy-4-nitrophenyl | $-CH_3$ | $-NHC_6H_4OC_2H_4N(CH_3)_3(p)$ | CN | $CH_3SO_4$ | Scarlet |
| 3-Phenyl-1,2,4-thiadiazolyl-5 | $-CH_3$ | 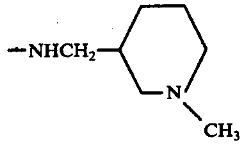 | CN | $C_6H_5SO_3$ | Orange |
| 2,6-Dibromo-4-nitrophenyl | $-C_3H_7$ | 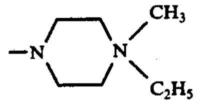 | CN | Br | Scarlet |
| 2,4,5-Trichlorophenyl | $-CH_3$ | 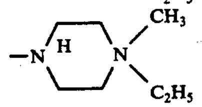 | CN | Br | Yellow |
| 2-Cyano-4-nitrophenyl | $-C_4H_9$ | $-NHC_2H_4N(C_2H_5)_3$ | CN | $C_2H_5SO_4$ | Scarlet |
| 5-Nitroindazolyl-3 | $-CH_3$ | $-NHC_2H_4OC_2H_4N(CH_3)_2$<br>$C_2H_4CONH_2$ | CN | 1/2 $SO_4$ | Orange |
| 2,6-Dicyano-4-nitrophenyl | $-C_2H_5$ | 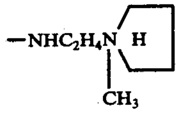 | CN | $CH_3SO_4$ | Ruby |
| 5-Nitro-2,1-benzisothisothiazol-yl-3 | $-C_2H_5$ | 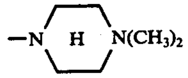 | CN | Cl | Violet |
| 4-Butylsulphonylphenyl | $-CH_2C_6H_5$ | 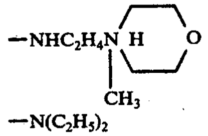 | CN | $CH_3SO_4$ | Orange |
| 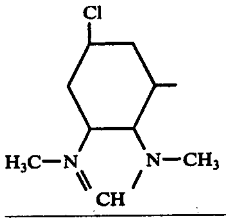 | $-C_3H_7$ | $-N(C_2H_5)_2$ | CN | $CH_3SO_4$ | Orange |

EXAMPLE 10

2.76 parts of 4-nitroaniline are made into a paste with 8 parts by volume of concentrated hydrochloric acid and the product is stirred into a mixture of 80 parts of ice and water. The suspension is diazotised at 0° to 5° C with 5 parts by volume of 4 N sodium nitrite solution. The diazo solution is added to a solution of 5.24 parts of 2-dimethylaminopropylamino-3-cyano-1-methyl-4-methylamino-6-imino-1,6-dihydropyridine in 40 parts of alcohol. After the coupling is complete, the pH of the mixture is adjusted to 8 with sodium hydroxide solution. The precipitated dyestuff is filtered off, washed with water and dried. The dyestuff of the formula

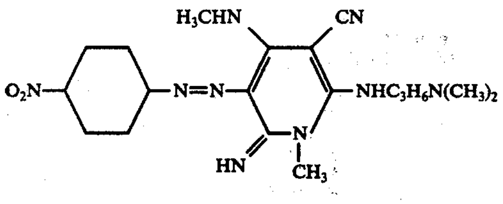

dyes polyacrylonitrile fibres in orange colour shades of very good fastness.

Further dyestuffs of the formula

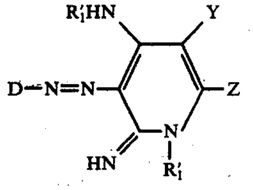

wherein the symbols D, $R_1'$, Y and Z have the meaning indicated in the following table are obtained in an analogous manner.

Table 7

| D | $R_1'$ | Z | Y | Colour shade |
|---|---|---|---|---|
| 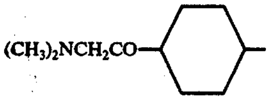 | $-CH_3$ | $-NHC_3H_6OCH(CH_3)_2$ | CN | Golden yellow |
| 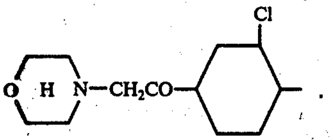 | $-CH_3$ | $-NHC_6H_4C_2H_5(p)$ | $CONH_2$ | Orange |
| 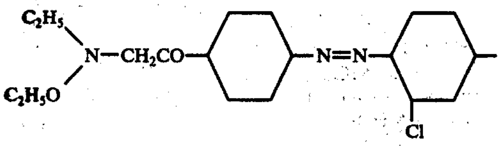 | $-C_2H_5$ | $-NHC_2H_5$ | CN | Orange |
| 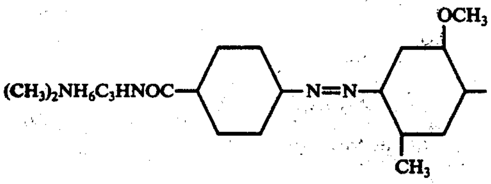 | $-C_3H_6OCH_3$ | $-N(CH_3)_2$ | CN | Scarlet |
| 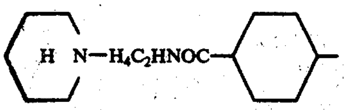 | $-C_3H_7$ | $-OC_6H_4OCH_3(p)$ | CN | Yellow |
| 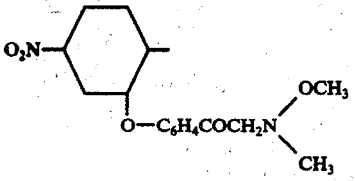 | $-CH_3$ | —NH—Cyclohexyl | CN | Orange |
| 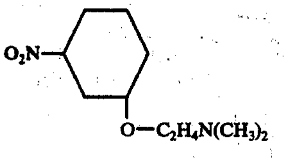 | $-CH_3$ | 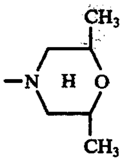 | $CONH_2$ | Scarlet |
| 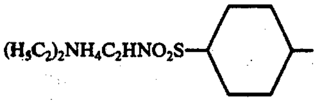 | $-C_2H_4C_6H_5$ | 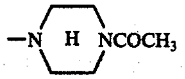 | CN | Orange |
| 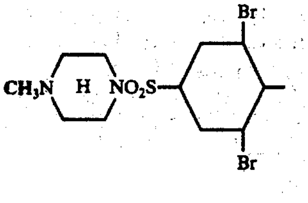 | 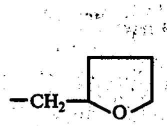 | $-NHC_3H_7$ | CN | Scarlet |

Table 7-continued

| D | $R_1$ | Z | Y | Colour shade |
|---|---|---|---|---|
| 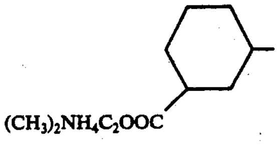 | $-C_2H_5$ | $-NHCH(CH_3)_2$ | CN | Yellow |
| 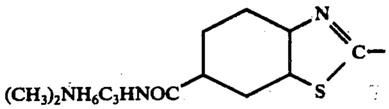 | $-CH_2CH(CH_3)_2$ | $-NHC_6H_4CH_3$(m) | CN | Scarlet |
| 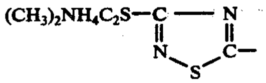 | $-C_2H_5$ | 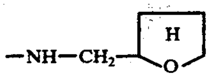 | CN | Orange |
| 2-Bromo-4-nitrophenyl | $-CH_3$ | $-NHC_3H_6N(CH_3)_2$ | $CONH_2$ | Scarlet |
| 4-Phenylazophenyl | $-CH_3$ | $-NHC_6H_4OC_2H_4N(CH_3)_2$(p) | CN | Orange |
| 6-Nitrobenzthiazolyl-2 | $-C_3H_6OCH_3$ | $-NHC_3H_6N(CH_3)_2$ | CN | Red |
| 4-Methoxycarbonylphenyl | $-C_2H_5$ | $-NHC_2H_4N-OCH_3$<br>$CH_3$ | CN | Golden yellow |
| 2,6-Dichloro-4-ethylamino-sulphonylphenyl | $-C_2H_5$ | 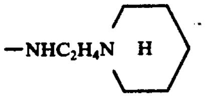 | CN | Orange |
| 3-Phenyl-1,2,4-thiadiazolyl-5 | $-CH_3$ | 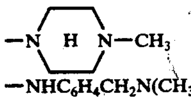 | CN | Orange |
| 5-Chloroindazolyl-3 | $-CH(CH_3)_2$ | $-NHC_6H_4CH_2N(CH_3)_2$(p) | CN | Orange |
| 5-Acetyl-3-nitrothiophenyl-2 | $-C_2H_4C_6H_5$ |  | CN | Red violet |
| 5-Methylsulphonylthiazolyl-2 | $-C_3H_6OC_2H_5$ | $-NHC_2H_4N(C_2H_5)_2$ | $CONH_2$ | Violet |
| 2-Ethyl-5-nitrophenyl | Cyclohexyl | $NHC_2H_4N-OC_2H_5$<br>$C_2H_5$ | CN | Yellow |
| 2-Chloro-4-nitrophenyl | $-CH_3$ | 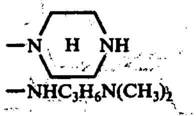 | CN | Orange |
| 3-Methyl-4-nitro-1,2-iso-thiazolyl-5 | $C_3H_7$ | $-NHC_3H_6N(CH_3)_2$ | CN | Red violet |
| 5-Chlorobenz-2,1-isothiazolyl-3 | $C_2H_5$ | $-NHC_2H_4N(C_2H_5)_2$ | CN | Red violet |
| 2-Cyano-4-nitrophenyl | $-CH_3$ | 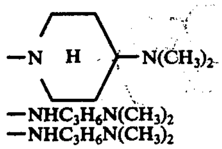 | CN | Scarlet |
| 2,4-Dinitrophenyl | $-CH_3$ | $-NHC_3H_6N(CH_3)_2$ | CN | Red |
| 4-ω-Dimethylaminoacetylphenyl | $-CH_3$ | $-NHC_3H_6N(CH_3)_2$ | CN | Golden yellow |

EXAMPLE 11

4.11 parts of the dyestuff described in Example 10 are dissolved in 150 parts of hot chlorobenzene. 1.9 parts of dimethyl sulphate, dissolved in 10 parts of chlorobenzene, are added dropwise and the reaction mixture is stirred at 95 to 100° C for a further 3 hours. After cooling, the suspension is filtered. The filter residue is dissolved in hot water and, after filtering the solution, is salted out from the filtrate with sodium chloride and zinc chloride. The precipitated dyestuff of the formula

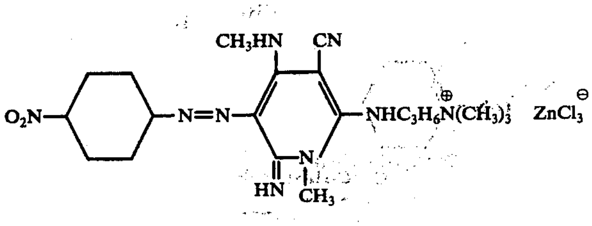

is filtered off and dried. It dyes polyacrylonitrile fibres in orange colour shades of very good fastness.

Further dyestuffs are obtained in an analogous manner by alkylating the dyestuffs described in the following text, of the forumla

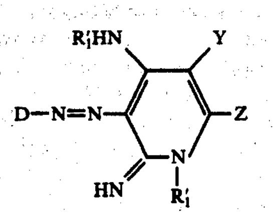

with the alkylating agents indicated in the penultimate column of the following table.

Table 8

| D | $R_1'$ | Z | Y | Alkylating agent | Colour shade |
|---|---|---|---|---|---|
| 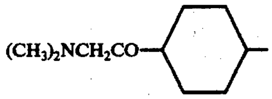 | $C_2H_5$ | $-NHC_2H_5$ | CN | $C_7H_7SO_3CH_3$ | Golden yellow |
| 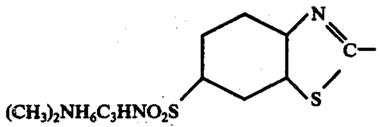 | $C_3H_7$ | $-N(C_2H_5)_2$ | CN | $C_6H_5CH_2Cl$ | Scarlet |
| 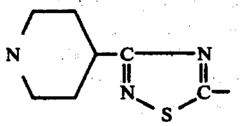 | $CH_3$ | $-NHCH(CH_3)_2$ | CN | $(CH_3)_2SO_4$ | Orange |
| 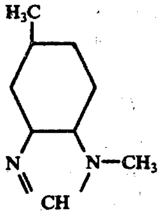 | $C_2H_5$ | $-NHCH_3$ | CN | $(CH_3)_2SO_4$ | Orange |
| 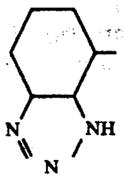 | $CH_3$ | 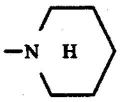 | CN | $(CH_3)_2SO_4$ | Orange |
| 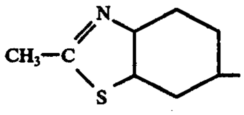 | $CH_3$ | $-NHC_6H_5$ | $CONH_2$ | $(C_2H_5)_2SO_4$ | Orange |
| 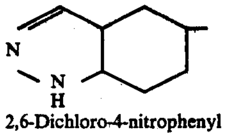 | $C_3H_6OCH_3$ | $OC_6H_5$ | CN | $C_6H_5SO_3CH_3$ | Yellow |
| 2,6-Dichloro-4-nitrophenyl | $CH_3$ | 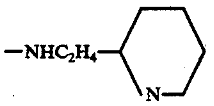 | CN | $(CH_3)_2SO_4$ | Scarlet |
| 4-Chloro-2-cyanophenyl | $C_2H_5$ | 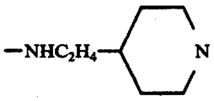 | CN | $(CH_3)_2SO_4$ | Orange |

Dyestuffs with equally good properties are obtained if the dyestuffs listed in Table 7 are quaternised with one of the following quaternising agents: Dimethyl sulphate, diethyl sulphate, ethyl iodide, butyl bromide, benzyl chloride, 2-chloroethanol, 2-chloropropionic acid ethyl ester, 2-bromopropionic acid amide, p-toluenesulphonic acid methyl ester, benzenesulphonic acid ethyl ester and ethylene oxide in acetic acid.

EXAMPLE 12

1.5 g of sodium nitrite are sprinkled into 18 g of concentrated sulphuric acid at 0° to 10° C and the mixture is heated to 65° C, until a clear solution is formed, and is then cooled to 0° C and 20 parts by volume of a mixture of glacial acetic acid and propionic acid in the ratio of 4:1 are added dropwise. A solution of 2 g of 2-aminothiazole in 20 parts by volume of a mixture of glacial acetic acid and propionic acid (4:1) is added dropwise to the resulting, cooled solution and the reaction mixture is stirred at 0° to 5° C for 3 hours and 1.5 g of urea are then added in portions. The diazo solution thus obtained is added to a solution of 3.82 g of 6-amino-3-cyano-1methyl-4-methylamino-2-methylimino-1,2-dihydropyridine in 40 ml of ethanol. The mixture is stirred for a further 2 hours and is then rendered neutral to Congo Red with sodium acetate solution. After the coupling is completed, the mixture is diluted with water and the precipitated dyestuff is filtered off, washed with water and dried.

3.02 g of the dyestuff thus obtained are dissolved in 60 g of hot chlorobenzene, 1.9 g of dimethyl sulphate dissolved in 10 g of chlorobenzene are added dropwise and the reaction mixture is stirred at 95° to 100° C for a further 3 hours. After cooling, the suspension which has separated out is filtered and the filter residue is dissolved in hot water, the solution is filtered and the dyestuff is salted out from the filtrate with sodium chloride. The precipitated dyestuff of the formula

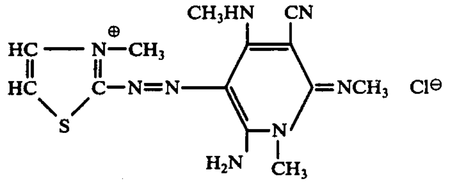

is filtered off and dried. It dyes polyacrylonitrile fibres in brilliant orange colour shades of excellent fastness.

Further quaternised dyestuffs are obtained in an analogous manner by alkylating the dyestuffs indicated in the following text, of the formula

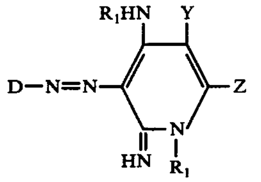

with the alkylating agents indicated in the penultimate column.

phenacyl chloride with 1-methyl-2-butylimino-3-cyano-4-methylamino-6-amino-1,2-dihydropyridine are stirred with 33 ml of 40% strength aqueous trimethylamine solution and 20 ml of water at 20° to 25° C for 20 hours and the mixture is then heated at 60° to 65° C for 5 hours. The mixture is then cooled and 500 ml of water and dilute hydrochloric acid are added until there is a weakly acid reaction. The mixture is heated and filtered hot and the filtrate is salted out with sodium chloride. The precipitated dyestuff of the formula

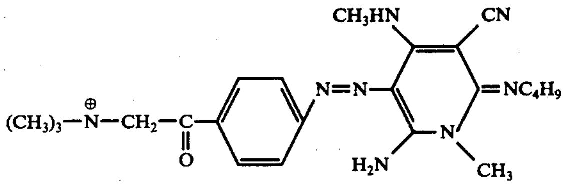

dyes polyacrylonitrile fibres in reddish-tinged yellow colour shades of very good fastness.

DYEING INSTRUCTION I 1 part of the dyestuff obtained according to Example 1 is dissolved in 2,000 parts of water with the addition of 4 parts of 40% strength acetic acid, 1 part of crystalline sodium acetate and 10 parts of anhydrous sodium sulphate. 100 parts of dried-off polyacrylonitrile staple fibre yarn are introduced into this dyebath at 60° C, the temperature is raised to 100° C over the course of half an hour and dyeing is carried out for one hour at the boil. The dyeing is then well rinsed and dried.

DYEING INSTRUCTION II 1 part of the dyestuff obtained according to Example 3, 1 part of a 50% strength neutralised reaction product of 1 mol of a higher alkylamine having about 20 carbon atoms with 30 mols of ethylene oxide, 1 part of concentrated acetic acid and 7 parts of water are ground into a fine dispersion in a ball mill.

The dyestuff preparation described above is added to a dyebath composed of 400 parts of water and 4 parts of a 50% strength solution of a condensation product of 1

Table 9

| D | $R_1'$ | Z | Y | Alkylating agent | Colour shade |
|---|---|---|---|---|---|
| Benzthiazolyl-2 | $-C_2H_5$ | -pyrrolidinyl | CN | $(C_2H_5)_2SO_4$ | Scarlet |
| Pyridine-3 | $-CH_3$ | $-NHC_4H_9$ | CN | $ClC_2H_4OH$ | Yellow |
| 4-(6'-Methyl-2'-benz-thiazolyl)-phenyl | $-C_3H_7$ | $-NH_2$ | CN | $BrCH_2CONH_2$ | Orange |
| 3-Methyl-1,2-iso-thiazolyl-5 | $-CH_3$ | $-N(CH_3)_2$ | CN | $(CH_3)_2SO_4$ | Orange |
| 3-Methyl-1-phenyl-pyrazolyl-5 | $-CH_3$ | $-NHCH_3$ | CN | $C_7H_7SO_3CH_3$ | Yellow |
| 1,2,4-Triazolyl-3 | $-C_2H_4C_6H_5$ | $-NHCH_3$ | CN | $(CH_3)_2SO_4$ | Yellow |
| 1-Methylimidazolyl-5 | $-C_3H_6OCH_3$ | $-NHC_6H_{13}$ | CN | $C_4H_9Br$ | Yellow |
| Indazolyl-3 | $-CH_3$ | $-N(CH_3)_2$ | CN | $(CH_3)_2SO_4$ | Orange |
| Benz-2,1-isothiazolyl-3 | $-CH_3$ | $-N(C_2H_5)_2$ | CN | $(CH_3)_2SO_4$ | Red |
| Thiazolyl-2 | $-CH_3$ | $-N(CH_3)_2$ | CN | $(CH_3)_2SO_4$ | Orange |
| 6-Methoxybenzthiazolyl-2 | $-CH_3$ | 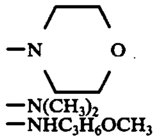 | CN | $C_6H_5SO_3C_2H_5$ | Scarlet |
| Pyridyl-2 | $-CH_3$ | $-N(CH_3)_2$ | CN | $(CH_3)_2SO_4$ | Orange |
| 5-Methyl-1,3,4-thia-diazolyl-2 | $-C_2H_5$ | $-NHC_3H_6OCH_3$ | CN | $(CH_3)_2SO_4$ | Orange |
| 1,2,4-Thiadiazolyl-5 | $-CH_3$ | $-NHC_3H_7$ | CN | $(CH_3)_2SO_4$ | Orange |
| 5-Imino-1,2,4-triazolyl-3 | $-CH_3$ | $-NHC_6H_5$ | CN | $(CH_3)_2SO_4$ | Yellow |
| 1-Phenylpyrazolyl-5 | $-C_3H_6OCH_3$ | $-NCH_2H_5$ | CN | $C_6H_5CH_2Cl$ | Yellow |
| 3-Methylpyrazolyl-5 | $-CH_3$ | $-N(C_2H_5)_2$ | CN | $(CH_3)_2SO_4$ | Yellow |
| 2-Methylquinolinyl-4 | $-C_2H_5$ | $-NHC_2H_5$ | $CONH_2$ | $C_7H_7SO_3CH_3$ | Scarlet |
| 5-,Methylthio-1,2,4-tri-azolyl-3 | $-CH_3$ | $-N(C_3H_7)_2$ | CN | $(CH_3)_2SO_4$ | Yellow |

EXAMPLE 13

18.5 g of 5-[4'-chloroacetylphenyl]-azo-1-methyl-2-butylimino-3-cyano-4-methylamino-6-amino-1,2-dihydropyridine, obtained by coupling diazotised 4-aminomol of 1-methyl-2-heptadecylbenzimidazole with 7 mols of ethylene oxide, the pH-value of which has been adjusted to 4 with acetic acid. 100 parts of well-wetted polyacrylonitrile flock are introduced into the liquor, which is heated to the boil over the course of 30 minutes, and dyeing is carried out for 1½ hours at the boil. The dyed material is then well rinsed. A level orange dyeing with excellent fastness properties is obtained.

I claim:

1. A basic azo dyestuff, free of acid groups conferring solubility in water, of the formula

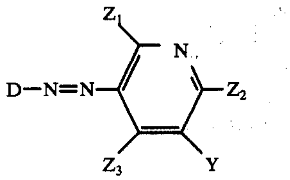

wherein

Y is —CN or —$CONH_2$, two of $Z_1$, $Z_2$ and $Z_3$ represent -NR'R" and the third represents -NR'R", -OR'" or -SR'", where R', R" and R'" independently represent hydrogen, alkyl of up to 12 carbon atoms, which is unsubstituted or substituted by: hydroxy, carboxy, carbalkoxy of 2 to 6 carbon atoms, alkoxy of 1 to 8 carbon atoms, phenoxy, acyloxy or acylamino wherein acyl is alkanoyl of up to 5 carbon atoms, alkylcarbamyl of up to 5 carbon atoms, alkoxycarbonyl of up to 5 carbon atoms, phenylcarbamyl, phenoxycarbonyl, benzoyl, phenoxyacetyl, chloracetyl or phenylacetyl; or phenyl which is unsubstituted or substituted by halo, lower alkyl, lower alkoxy, β-hydroxyethyl or lower carboalkoxy;

phenyl which is unsubstituted or substituted by chloro, bromo, fluoro, alkyl of 1 to 6 carbon atoms which is unsubstituted or substituted by bromo, chloro, lower alkoxy, cyano or lower alkoxycarbonyl; lower alkoxycarbonyl, trifluoromethyl, acetyl, aminocarbonyloxy, aminosulfonyl, lower alkylaminosulfonyl, di(lower alkyl) aminosulfonyl, methylsulfonyl, ethylsulfonyl, methylthio, ethylthio or phenylthio; $C_5$–$C_9$ cycloalkyl; and R' and R", taken together with the nitrogen atom to which they are linked, additionally represent piperidinyl, pyrollidinyl, morpholino, piperazinyl, methylpiperazinyl, acetylpiperazinyl or 3-picolyl;

D is phenyl;

phenyl substituted by chloro, bromo, fluoro, hydroxy, cyano, thiocyano, nitro, lower alkyl, trifluoromethyl, lower alkoxy, lower alkylmercapto, formyl, loweralkylcarbonyl, benzoyl, methylbenzoyl, lower alkoxycarbonyl, lower alkoxycarbonyloxy, benzyloxycarbonyloxy, cyclohexylcarbonyl, phenoxycarbonyl, benzoyloxy, lower alkylcarbonylamino, benzoylamino, loweralkylsulphonyl, chloroethylsulphonyl, hydroxyethylsulphonyl, aminosulphonyl, N-(lower alkyl) aminosulphonyl, N,N-(diloweralkyl) aminosulphonyl, di(β-hydroxyethyl) aminosulphonyl, phenylaminosulphonyl, (chloro-or methoxy-) phenylaminosulphonyl, benzylaminosulphonyl, N-piperidylsulphonyl, N-morpholinosulphonyl, lower alkylsulphonyloxy, cyclohexylsulphonyloxy, chloromethylsulphonyloxy, cyanoethylsulphonyloxy, phenylsulphonyloxy, aminosulphonyloxy, (chloro- or methoxy-) phenylsulphonyloxy, N-morpholinosulphonyloxy, ethyleneiminosulphonyloxy, lower monoalkylaminosulphonyloxy, phenylaminosulphonyloxy, N-phenyl-N(lower alkyl) aminosulphonyloxy, N-(methoxy- or chloro-) phenylaminosulphonyloxy, phenylamino, nitrophenylamino, dinitrophenylamino, phenyl, phenoxy or acetylphenyl; phenylazophenyl;

phenylazophenyl substituted by chloro, bromo, hydroxy, cyano, nitro, lower alkyl, trifluoromethyl, lower alkoxy or phenoxy; napthyl;

napthyl substituted by methoxy, ethoxy, phenylazo or dimethylaminosulphonyl; or

D is a nitrogen heterocyclic group selected from thiazolyl or thiazolyl substituted by chloro, bromo, cyano, thiocyano, lower alkyl, lower alkoxy, lower alkylmercapto, phenyl, benzyl, phenethyl, lower alkoxycarbonyl, trifluoromethyl, lower alkylcarbonyl or lower alkylsulphonyl;

benzythiazolyl or benzthiazolyl substituted by chloro, bromo, cyano, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl, aminosulphonyl, lower alkylaminosulphonyl, di(lower alkyl) aminosulphonyl;

pyrazolyl or pyrazolyl substituted by cyano, lower alkyl, lower alkoxy, lower alkoxycarbonyl or phenyl; thiadizolyl or thiadiazolyl substituted by lower alkoxy, lower alkyl, phenyl, lower alkylsulphonyl or lower alkylmercapto;

imidazolyl or imidazolyl substituted by nitro or lower alkyl;

isothiazolyl or isothiazolyl substituted by lower alkyl, nitro, lower alkylsulphonyl, lower alkoxycarbonyl, cyano or phenyl;

benzisothiazolyl or benzisothiazolyl substituted by lower alkyl, nitro or halo; benzimidazolyl or benzimidazolyl substituted by lower alkyl, nitro or halo;

napthiazolyl or napthiazolyl substituted by lower alkyl, nitro or halo;

quinolinyl or quinolyl substituted by lower alkyl, nitro or halo;

benzoxazolyl or benzoxazolyl substituted by lower alkyl, nitro or halo;

pyridinyl or pyridinyl substituted by lower alkyl, nitro or halo;

indazolyl or indazolyl substituted by lower alkyl, nitro or halo;

selenazolyl or selenazolyl substituted by lower alkyl, nitro or halo;

oxazolyl or oxazolyl substituted by lower alkyl, nitro or halo;

oxadiazolyl or oxadiazolyl substituted by lower alkyl, nitro or halo; and triazolyl or triazolyl substituted by lower alkyl, nitro or halo; or D is thienyl or thienyl substituted by nitro, lower alkyl, lower alkylsulphonyl, lower alkoxycarbonyl or acetyl;

with the proviso that either a. one of $Z_1$, $Z_2$, $Z_3$ or D is further substituted either by a direct bond or via an alkylene, alkyleneoxy, alkylenecarbonyl, carbonyloxy, carbonylamino, alkylenecarbonyloxy, alkylenecarbonylamino, alkylenesulphonylamino or alkylenesulphonyl group by

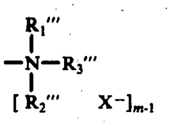
i)

wherein
$R_1'''$ and $R_2'''$ independently represent lower alkyl, benzyl, phenethyl, β-hydroxyethyl, β-carbethoxyethyl or cyclohexyl,
$R_3'''$ is lower alkyl, benzyl, cyclohexyl, lower alkoxy or $-NH_2$
and two of $R_1'''$, $R_2'''$ and $R_3'''$ can further represent, together with the nitrogen to which they are attached, piperidino, methylpiperdino, pyrrolidino, morpholino, piperazinyl or imidazolyl,
X is an anion and *m* is 1 or 2; or by ii)
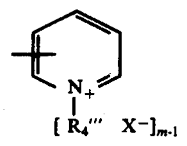

wherein
$R_4'''$ is alkyl of 1–4 carbon atoms, cyclohexyl or benzyl,
X is an anion and *m* is 1 or 2; or
b. when D is said nitrogen heterocyclic group, D is in the form of its N-(lower alkyl or benzyl) quaternary ammonium salt thereof.

2. A basic azo dyestuff according to claim 1 of the formula

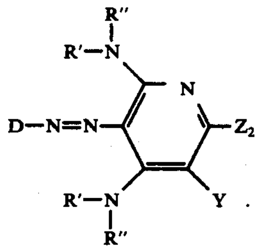

3. A basic azo dyestuff according to claim 1, wherein Y is —CN.

4. A basic azo dyestuff according to claim 2, wherein D is said nitrogen heterocyclic group.

5. A basic azo dyestuff according to claim 2, wherein R' and R'' are hydrogen.

6. A basic azo dyestuff according to claim 2, which is substituted by

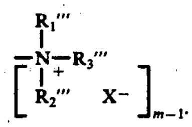

7. A basic azo dyestuff according to claim 2, which is substituted by

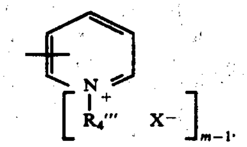

8. A basic azo dyestuff according to claim 6, wherein $R_1'''$, $R_2'''$ and $R_3'''$ are lower alkyl.

9. A basic azo dyestuff according to claim 7, wherein $R_4'''$ is lower alkyl.

10. A basic azo dyestuff according to claim 2, wherein D is said phenyl substituted phenyl, phenylazophenyl or substituted phenylazophenyl.

11. A basic azo dyestuff, free from acid groups conferring water-solubility of the formula

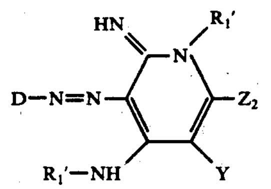

wherein
$R_1'$ is cycloalkyl of 5 to 9 carbon atoms or alkyl of 1 to 6 carbon atoms which is unsubstituted or substituted by: hydroxy, carboxy, cyano, carbalkoxy of 2 to 6 carbon atoms, alkoxy of 1 to 8 carbon atoms, phenoxy, phenyl or phenyl substituted by halo, lower alkyl, lower alkoxy, β-hydroxyethyl or lower carbalkoxy;
alkylcarbamyl of up to 5 carbon atoms, alkylcarbamyl of up to 5 carbon atoms, alkoxycarbonyl of up to 5 carbon atoms, phenylcarbamyl, phenoxycarbonyl, benzoyl, phenoxyacetyl, chloroacetyl or phenylacetyl;
Y is —CN or $-CONH_2$, $Z_2$ is

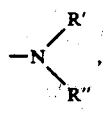

or OR''' or —SR''',
wherein
R', R'' and R''' represent
hydrogen,
alkyl of up to 12 carbon atoms, which is unsubstituted or substituted by: hydroxy, carboxy, carbalkoxy of 2 to 6 carbon atoms, alkoxy of 1 to 8 carbon atoms, phenoxy, acyloxy or acylamino wherein acyl is alkanoyl of up to 5 carbon atoms, alkylcarbamyl of up to 5 carbon atoms, alkoxycarbonyl of up to 5 carbon atoms, phenylcarbamyl, phenoxycarbonyl, benzoyl, phenoxyacetyl, chloracetyl or phenylacetyl; or phenyl which is unsubstituted or substituted by halo, lower alkyl, lower alkoxy, β-hydroxyethyl or lower carboalkoxy;
phenyl which is unsubstituted or substituted by chloro, bromo, fluoro, alkyl of 1 to 6 carbon atoms which is unsubstituted or substituted by bromo, chloro, lower alkoxy, cyano or lower alkoxycarbonyl; lower alkoxycarbonyl, trifluoromethyl, acetyl, aminocarbonyloxy, aminosulfonyl, lower alkylaminosulfonyl, di(lower alkyl) aminosulfonyl, methylsulfonyl, ethylsulfonyl, methylthio, ethylthio or phenylthio;

$C_5$–$C_9$ cycloalkyl; and

R' and R'', taken together with the nitrogen atom to which they are linked, additionally represent piperindinyl, pyrollidinyl, morpholino, piperazinyl, methylpiperazinyl, acetylpiperazinyl or 3-picolyl;

D is phenyl;

phenyl substituted by chloro, bromo, fluoro, hydroxy, cyano, thiocyano, nitro, lower alkyl, trifluoromethyl, lower alkoxy, lower alkylmercapto, formyl, lower-alkylcarbonyl, benzoyl, methylbenzoyl, lower alkoxycarbonyl, lower alkoxycarbonyloxy, benzyloxycarbonyloxy, cyclohexylcarbonyl, phenoxycarbonyl, benzoyloxy, lower alkylcarbonylamino, benzoylamino, loweralkylsulphonyl, chloroethylsulphonyl, hydroxyethylsulphonyl, aminosulphonyl, N-(lower alkyl) aminosulphonyl, N,N-(diloweralkyl) aminosulphonyl, di(β-hydroxyethyl) aminosulphonyl, phenylaminosulphonyl, (chloro-or methoxy-) phenylaminosulphonyl, benzylaminosulphonyl, N-piperidylsulphonyl, N-morpholinosulphonyl, lower alkylsulphonyloxy, cyclohexylsulphonyloxy, chloromethylsulphonyloxy, cyanoethylsulphonyloxy, phenylsulphonyloxy, aminosulphonyloxy, (chloro-or methoxy-) phenylsulphonyloxy, N-morpholinosulphonyloxy, ethyleneiminosulphonyloxy, lower monoalkylaminosulphonyloxy, phenylaminosulphonyloxy, N-phenyl-N(lower alkyl) aminosulphonyloxy, N- (methoxy- or chloro-) phenylaminosulphonyloxy, phenylamino, nitrophenylamino, dinitrophenylamino, phenyl, phenoxy or acetylphenyl; phenylazophenyl;

phenylazophenyl substituted by chloro, bromo, hydroxy, cyano, nitro, lower alkyl, trifluoromethyl, lower alkoxy or phenoxy; napthyl;

napthyl substituted by methoxy, ethoxy, phenylazo or dimethylaminosulphonyl; or

D is a nitrogen heterocyclic group selected from thiazolyl or thiazolyl substituted by chloro, bromo, cyano, thiocyano, lower alkyl, lower alkoxy, lower alkylmercapto, phenyl, benzyl, phenethyl, lower alkoxycarbonyl, trifluoromethyl, lower alkylcarbonyl or lower alkylsulphonyl;

benzythiazolyl or benzthiazolyl substituted by chloro, bromo, cyano, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl, aminosulphonyl, lower alkylaminosulphonyl, di(lower alkyl) aminosulphonyl; pyrazolyl or pyrazolyl substituted by cyano, lower alkyl, lower alkoxy, lower alkoxycarbonyl or phenyl; thiadiazolyl or thiadiazolyl substituted by lower alkoxy, lower alkyl, phenyl, lower alkylsulphonyl or lower alkylmercapto;

imidazolyl or imidazolyl substituted by nitro or lower alkyl;

isothiazolyl or isothiazolyl substituted by lower alkyl, nitro, lower alkylsulphonyl, lower alkoxycarbonyl, cyano or phenyl;

benzisothiazolyl or benzisothiazolyl substituted by lower alkyl, nitro or halo;

benzimidazolyl or benzimidazolyl substituted by lower alkyl, nitro or halo;

napthiazolyl or napthiazolyl substituted by lower alkyl, nitro or halo;

quinolinyl or quinolyl substituted by lower alkyl, nitro or halo;

benzoxazolyl or benzoxazolyl substituted by lower alkyl, nitro or halo;

pyridinyl or pyridinyl substituted by lower alkyl, nitro or halo;

indazolyl or indazolyl substituted by lower alkyl, nitro or halo;

selenazolyl or selenazolyl substituted by lower alkyl, nitro or halo;

oxazolyl or oxazolyl substituted by lower alkyl, nitro or halo;

oxadiazolyl or oxadiazolyl substituted by lower alkyl, nitro or halo; and triazolyl or triazolyl substituted by lower alkyl, nitro or halo; or D is thienyl or thienyl substituted by nitro, lower alkyl, lower alkylsulphonyl, lower alkoxycarbonyl or acetyl; with the proviso that either a. one of $Z_2$ or D is further substituted either by a direct bond or via an alkylene, alkyleneoxy, alkylenecarbonyl, carbonyloxy, carbonylamino, alkylenecarbonyloxy, alkylenecarbonylamino, alkylenesulphonylamino or alkylenesulphonyl group by

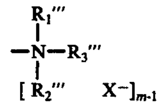

i)

wherein $R_1'''$ and $R_2'''$ independently represent lower alkyl, benzyl, phenethyl, β-hydroxyethyl, β-carbethoxyethyl, or cyclohexyl, $R_3'''$ is lower alkyl, benzyl, cyclohexyl, lower alkoxy or $-NH_2$ and two of $R_1'''$, $R_2'''$ and $R_3'''$ can further represent, together with the nitrogen to which they are attached, methylpiperidino, pyrrolidino, piperidino, morpholino, piperazinyl or imidazolyl, X is an anion and m is 1 or 2; or by

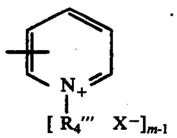

ii)

wherein $R_4'''$ is alkyl of 1–4 carbon atoms, cyclohexyl or benzyl,

X is an anion and *m* is 1 or 2; or b. when D is said nitrogen heterocyclic group, D is in the form of its N-(lower alkyl or benzyl) quaternary ammonium salt thereof.

12. A basic azo dyestuff according to claim 11, wherein $R_1'$ is alkyl of 1 to 6 carbon atoms, cyclohexyl, benzyl or phenethyl.

13. A basic azo dyestuff according to claim 11, wherein $Z_2$ is —NR'R''.

14. A basic azo dyestuff according to claim 11, wherein $Z_2$ is said —OR''' group and R''' is said phenyl or substituted phenyl.

15. A basic azo dyestuff according to claim 11, wherein Y is —CN.

16. A basic azo dyestuff according to claim 11, wherein D is said phenyl, substituted phenyl, phenylazophenyl or substituted phenylazophenyl.

17. A basic azo dyestuff according to claim 11 which is substituted by

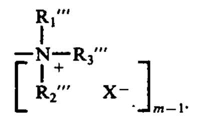

18. A basic azo dyestuff according to claim 11 which is substituted by

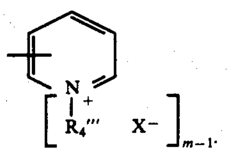

19. A basic azo dyestuff according to claim 17, wherein $R_1'''$, $R_2'''$ and $R_3'''$ are alkyl of 1–4 carbon atoms.

20. A basic azo dyestuff according to claim 18, wherein $R_4'''$ is alkyl of 1–4 carbon atoms.

21. A basic azo dyestuff according to claim 11, of the formula

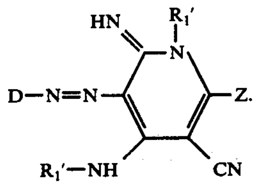

wherein Z is —NR'R''.

22. A basic azo dyestuff according to claim 11, wherein D is said nitrogen heterocyclic group.

23. An azo dyestuff according to claim 1 of the formula

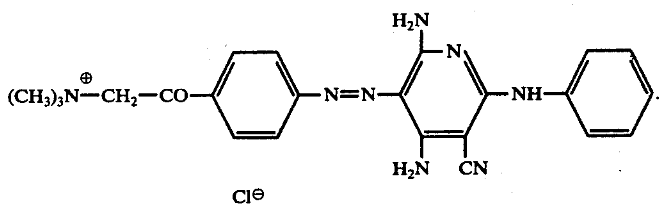

24. An azo dyestuff according to claim 1 of the formula

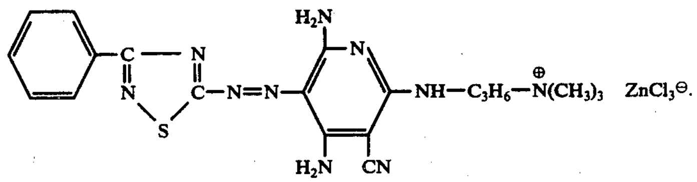

25. An azo dyestuff according to claim 11 of the formula

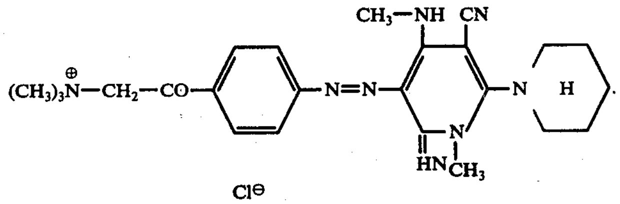

* * * * *